United States Patent
Ishii et al.

(10) Patent No.: US 11,851,764 B2
(45) Date of Patent: Dec. 26, 2023

(54) PLATED STEEL MATERIAL

(71) Applicant: NIPPON STEEL CORPORATION, Tokyo (JP)

(72) Inventors: Kotaro Ishii, Tokyo (JP); Kohei Tokuda, Tokyo (JP); Yoshinari Ishida, Tokyo (JP); Yasuto Goto, Tokyo (JP); Mamoru Saito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/033,739

(22) PCT Filed: Nov. 18, 2021

(86) PCT No.: PCT/JP2021/042376
§ 371 (c)(1),
(2) Date: Apr. 25, 2023

(87) PCT Pub. No.: WO2022/107837
PCT Pub. Date: May 27, 2022

(65) Prior Publication Data
US 2023/0304136 A1  Sep. 28, 2023

(30) Foreign Application Priority Data

Nov. 18, 2020  (JP) ................ 2020-191503

(51) Int. Cl.
*B32B 15/01* (2006.01)
*C23C 2/06* (2006.01)
(Continued)

(52) U.S. Cl.
CPC .............. *C23C 2/06* (2013.01); *B32B 15/013* (2013.01); *B32B 15/04* (2013.01); *B32B 15/043* (2013.01);
(Continued)

(58) Field of Classification Search
CPC ......... C23C 30/00; C23C 30/005; C23C 2/06; C23C 2/04; C23C 2/40; C23C 28/025;
(Continued)

(56) References Cited

U.S. PATENT DOCUMENTS 6,235,410 B1  5/2001  Komatsu et al.
6,465,114 B1  10/2002  Honda et al.
(Continued)

FOREIGN PATENT DOCUMENTS

JP  10-226865 A  8/1998
JP  2014-501334 A  1/2014
(Continued)

OTHER PUBLICATIONS

Notice of Allowance issued in Japanese Patent Application No. 2022-503479 dated Feb. 8, 2022.

*Primary Examiner* — Michael E. La Villa
(74) *Attorney, Agent, or Firm* — Birch, Stewart, Kolasch & Birch, LLP

(57) ABSTRACT

The plated steel material is a plated steel material including a steel material and a plating layer provided on the surface of the steel material, wherein the plating layer has a predetermined average chemical composition, when the amount of Mg is % Mg and the amount of Al is % Al, % Mg/% Al is 0.80 or more, and a metal structure in a total field of view of 25,000 μm$^2$ in a vertical cross section which is a cross section in a thickness direction of the plating layer includes 10 to 40 area % of a MgZn$_2$ phase, 10 to 30 area % of an Al—Zn phase with a Zn content of 10% or more, 0 to 15 area % of an Al phase with a Zn content of less than 10%, and 25 area % or more of an Al/MgZn$_2$/Zn ternary eutectic structure.

4 Claims, 2 Drawing Sheets

(51) Int. Cl.
    *C22C 18/04*    (2006.01)
    *C23C 30/00*    (2006.01)
    *C23C 2/40*     (2006.01)
    *C23C 28/00*    (2006.01)
    *B32B 15/18*    (2006.01)
    *C23C 2/04*     (2006.01)
    *B32B 15/04*    (2006.01)
    *C22C 18/00*    (2006.01)
    *C23C 28/02*    (2006.01)

(52) U.S. Cl.
    CPC .............. *B32B 15/18* (2013.01); *C22C 18/00* (2013.01); *C22C 18/04* (2013.01); *C23C 2/04* (2013.01); *C23C 2/40* (2013.01); *C23C 28/025* (2013.01); *C23C 28/3225* (2013.01); *C23C 30/00* (2013.01); *C23C 30/005* (2013.01); *Y10T 428/12792* (2015.01); *Y10T 428/12799* (2015.01); *Y10T 428/12951* (2015.01); *Y10T 428/12972* (2015.01); *Y10T 428/12979* (2015.01)

(58) Field of Classification Search
    CPC ..... C23C 28/3225; C22C 18/04; C22C 18/00; B32B 15/013; B32B 15/04; B32B 15/043; B32B 15/18; Y10T 428/12792; Y10T 428/12799; Y10T 428/12951; Y10T 428/12972; Y10T 428/12979
    See application file for complete search history.

(56) References Cited

U.S. PATENT DOCUMENTS

| | | | |
|---|---|---|---|
| 2014/0127531 A1* | 5/2014 | Yasui | B32B 15/01 |
| | | | 428/659 |
| 2015/0159253 A1* | 6/2015 | Oh | C23C 2/29 |
| | | | 427/349 |
| 2015/0368778 A1 | 12/2015 | Allely et al. | |
| 2018/0237897 A1 | 8/2018 | Hashimoto et al. | |
| 2021/0147971 A1 | 5/2021 | Harada et al. | |

FOREIGN PATENT DOCUMENTS

| | | |
|---|---|---|
| JP | 2016-514202 A | 5/2016 |
| JP | 2017-145503 A | 8/2017 |
| TW | 202003880 A | 1/2020 |
| WO | WO 00/71773 A1 | 11/2000 |
| WO | WO 2012/091385 A2 | 7/2012 |
| WO | WO 2016/162982 A1 | 10/2016 |
| WO | WO 2019/009003 A1 | 1/2019 |

* cited by examiner

PLATED STEEL MATERIAL

TECHNICAL FIELD

The present invention relates to a plated steel material. Priority is claimed on Japanese Patent Application No. 2020-191503, filed Nov. 18, 2020, the content of which is incorporated herein by reference.

BACKGROUND ART

Steel structures are used in various fields because they can secure strength at a relatively low cost. Steel structures are constructed by combining various materials such as sheets, rods, and wires by processing, welding or the like. For welding of materials, various welding methods, for example, arc welding, spot welding, and laser welding are applied. Among these, spot welding has been focused on. The reasons for this are that spot welding has features that a solubilizing agent is not necessary, a welding rate is high, the amount of slag and fumes is small, it is labor-saving, it is not easily affected by the proficiency of operators, pinpoint welding is possible so that there is little heat effect around the welded part, and it is possible to bond different types of materials. However, when spot welding is performed, it is necessary to consider the properties of a material to be welded, an appropriate current value for each material to be welded, and selection of electrodes.

In addition, since many steel structures are required to have a certain level of corrosion resistance, many steel structures are plated. There are two methods of obtaining a plated steel structure. One is a method of immersing a steel structure in a plating bath after a steel sheet or the like is molded and welded to form the steel structure. Hereinafter, this method will be called an immersion plating method for convenience of explanation. As another method, a steel structure is produced by molding and welding a plated steel sheet with a surface on which the plating layer is formed in advance. Hereinafter, this method will be called a pre-plating method for convenience of explanation. In the former immersion plating method, distortion from heating may occur after molding, appearance defects may occur during plating layer solidification, and large-scale facilities and increased costs may be required in order to directly immerse steel structures in plating baths. Therefore, in many cases in which steel structures can be automatically produced, the latter pre-plating method is often used.

In the pre-plating method, spot welding is often used as a welding method, but the plating layer of the plated steel sheet can make spot welding difficult. The first reason for this is that the plating layer is thinner than a base steel sheet and is easily dissolved during spot welding, and particularly, in the case of a plated steel sheet having a plating layer with a thickness of more than 10 μm, it is necessary to cope with dissolution of the plating layer during welding, and spot welding becomes difficult. The second reason for this is that, when the plating layer becomes thick, electrical conduction and heat conduction become unstable, a current becomes unstable, and an appropriate weld nugget diameter may not be obtained. That is, the width of the appropriate current range is reduced. The third reason is that, when a welding electrode comes into contact with the plating layer during welding, metals such as Zn and Al contained in the plating layer may react with Cu, which is a main component of the welding electrode, causing wear of the welding electrode. For these reasons, spot welding of the plated steel sheet is difficult.

Therefore, for example, in the field of automobiles, spot welding is used for plated steel sheets having a relatively small variation in properties and a relatively small sheet thickness such as galvannealed steel sheets and galvanized steel sheets, but it is difficult to set welding conditions when spot welding is performed on other plating materials. Therefore, for example, spot-welding of the alloy-based plated steel sheets described in Patent Document 1 and Patent Document 2 has only been used for limited applications.

CITATION LIST

Patent Document

[Patent Document 1]
Japanese Patent Application Publication No. H10-226865
[Patent Document 2]
WO 2000/71773

SUMMARY OF THE INVENTION

Problems to be Solved by the Invention

The present invention has been made in view of the above circumstances, and an object of the present invention is to provide a plated steel material which has excellent continuous spotting properties during spot welding, can widen an appropriate current range during spot welding, and has excellent corrosion resistance around a welded part.

Means for Solving the Problem

In order to address the above problems, the present invention provides the following configurations.
[1] A plated steel material including a steel material and a plating layer provided on the surface of the steel material,
wherein the plating layer has an average chemical composition including, in mass %,
Al: more than 4.0% and less than 15.0%,
Mg: more than 3.2% and less than 12.5%.
Sn: 0% or more and less than 3.00%,
Bi: 0% or more and less than 1.00%.
In: 0% or more and less than 1.00%,
Ca: 0% or more and less than 2.00%,
Y: 0% or more and less than 0.50%,
La: 0% or more and less than 0.50%,
Ce: 0% or more and less than 0.50%,
Sr: 0% or more and less than 0.50%,
Si: 0% or more and less than 2.50%,
B: 0% or more and less than 0.50%,
P: 0% or more and less than 0.50%,
Cr: 0% or more and less than 0.25%,
Ti: 0% or more and less than 0.25%,
Ni: 0% or more and less than 1.0%,
Co: 0% or more and less than 0.25%,
V: 0% or more and less than 0.25%,
Nb: 0% or more and less than 0.25%,
Cu: 0% or more and less than 0.40%,
Mn: 0% or more and less than 0.25%,
Fe: 0% or more and less than 5.00%,
Sb: 0% or more and less than 0.5%, and
Pb: 0% or more and less than 0.5%,
with the remainder being more than 50.00% of Zn and impurities, wherein, in mass %, when the amount of Mg is % Mg and the amount of Al is % Al, % Mg/% Al is 0.80 or more, and wherein a metal structure in a total field of view of 25,000 μm² in a vertical cross section which is a cross section in a thickness direction of the plating layer includes 10 to 40 area % of a MgZn₂ phase, 10 to 30 area % of an Al—Zn phase with a Zn content of 10% or more, 0 to 15 area % of an Al phase with a Zn content of less than 10%, and 25 area % or more of an A/MgZn₂/Zn ternary eutectic structure.

[2] The plated steel material according to [1], wherein, in the average chemical composition of the plating layer, the amount of at least one or two or more of Ca, Y, La, Ce, and Sr is 0.01 mass % or more.

[3] The plated steel material according to [1] or [2], wherein the average circle-equivalent diameter of the top 80% MgZn₂ phase particles having the largest circle-equivalent diameter among the MgZn₂ phase particles of the metal structure in a total field of view of 25.000 μm² in a vertical cross section which is a cross section in a thickness direction of the plating layer is 30 μm or more.

Effects of the Invention

According to the above aspects of the present invention, it is possible to provide a plated steel material which has excellent continuous spotting properties during spot welding, can widen an appropriate current range during spot welding, and has excellent corrosion resistance around a welded part.

EMBODIMENT(S) FOR IMPLEMENTING THE INVENTION

Figure 1:
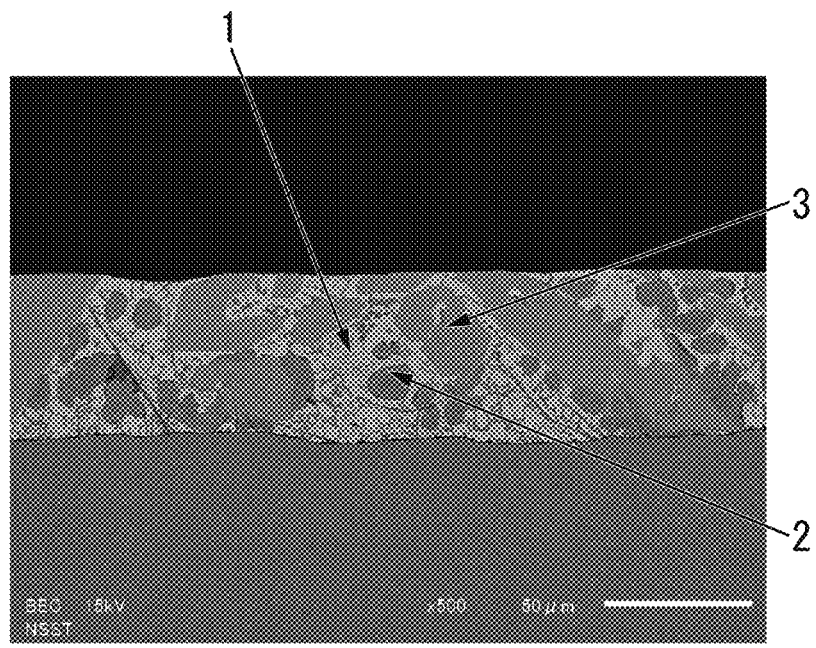
FIG. 1 shows an SEM reflected electron image of a vertical cross-sectional structure of a plating layer of test No. 6 (example).

As described above, a Zn—Al—Mg-based plating layer is a Zn alloy-based plating layer and is generally difficult to weld. On the other hand, a Zn—Al—Mg-based plating layer has higher corrosion resistance than a general Zn plating layer. Therefore, a plated steel material having a Zn—Al—Mg-based plating layer will be a promising plated steel material as a steel structure material as long as the spot welding properties of the plating layer can be improved.

The inventors conducted extensive studies in order to improve the weldability and corrosion resistance of a plated steel material, and found that an Al phase having an average crystal particle size of 1 μm or more (with a Zn concentration of less than 10%) present in a mass in a plating layer is a factor causing the spot welding properties to be unstable. When a large amount of an Al phase with a Zn concentration of less than 10% is generated, an appropriate current range during welding is narrowed. On the other hand, it has been found that, when the Al phase amount is reduced, the appropriate current range is widened and the plating layer becomes easier to weld. In addition, it has been found that, when elements such as Mg and Ca are incorporated into the plating layer, an appropriate current value becomes wider. In addition, it has been found that, when an appropriate amount of Mg and Ca is contained, these elements form a Ca—Mg-based oxide layer or the like on the surface of a Cu electrode during spot welding, this oxide coating inhibits a reaction between the Cu electrode and Al in the plating layer, and the lifespan of the electrode is improved.

In addition, the plated steel material according to the present invention has particularly excellent corrosion resistance. This is because, when the average crystal particle size of the MgZn₂ phase particles, which occupy a large volume fraction in the plating layer, increases, it becomes difficult for it to react with the Cu electrode during welding, this makes it difficult for the plating layer itself to dissolve, damage around the welded part of the plating layer is minimized, the remaining amount of the plating layer can increase, and thereby corrosion resistance of the welded part is improved. Thus, a steel structure produced by spot welding the plated steel material according to the present invention has excellent corrosion resistance.

Hereinafter, a plated steel material according to an embodiment of the present invention will be described.

The plated steel material of the present embodiment is a plated steel material including a steel material and a plating layer provided on the surface of the steel material, and the plating layer has an average chemical composition including, in mass %, Al: more than 4.0% and less than 15.0%, Mg: more than 3.2% and less than 12.5%, Sn: 0% or more and less than 3.00%, Bi: 0% or more and less than 1.00%, In: 0% or more and less than 1.00%, Ca: 0% or more and less than 2.00%, Y: 0% or more and less than 0.50%, La: 0% or more and less than 0.50%, Ce: 0% or more and less than 0.50%, Sr: 0% or more and less than 0.50%, Si: 0% or more and less than 2.50%, B: 0% or more and less than 0.50%, P: 0% or more and less than 0.50%, Cr: 0% or more and less than 0.25%, Ti: 0% or more and less than 0.25%, Ni: 0% or more and less than 1.0%, Co: 0% or more and less than 0.25%, V: 0% or more and less than 0.25%, Nb: 0% or more and less than 0.25%, Cu: 0% or more and less than 0.40%, Mn: 0% or more and less than 0.25%, Fe: 0% or more and less than 5.00%, Sb: 0% or more and less than 0.5%, Pb: 0% or more and less than 0.5%, and with the remainder being more than 50.00% of Zn and impurities. In addition, in the plated steel material of the present embodiment, when the amount of Mg is % Mg and the amount of Al is % Al, % Mg/% Al is 0.80 or more. Here, the plated steel material of the present embodiment is a plated steel material in which a metal structure in a total field of view of 25,000 μm² in a vertical cross section which is a cross section in a thickness direction of the plating layer includes 10 to 40 area % of a MgZn₂ phase, 10 to 30 area % of an Al—Zn phase with a Zn content of 10% or more, 0 to 15 area % of an Al phase with a Zn content of less than 10%, and 25 area % or more of an [Al/MgZn₂/Zn ternary eutectic structure].

In addition, in the plated steel material of the present embodiment, the average chemical composition of the plating layer preferably contains 0.01 mass % or more of at least one or two or more of Ca, Y. La, Ce, and Sr.

In addition, the average circle-equivalent diameter of the top 80% MgZn₂ phase particles having the largest circle-equivalent diameter among MgZn₂ phase particles of the metal structure in a total field of view of 25,000 μm² in a vertical cross section which is a cross section in a thickness direction of the plating layer is preferably 30 μm or more.

In the following description, the "%" amount of each element in the chemical composition means "mass %." In addition, when a numerical value range is indicated using "to." the range includes numerical values stated before and after "to" as a lower limit value and an upper limit value. Here, a numerical value range when "more than" or "less than" is attached to numerical values stated before and after "to" means a range that does not include these numerical values as a lower limit value or an upper limit value.

"Corrosion resistance" is a property of the plating layer itself being resistant to corrosion. Since the Zn-based plating layer has a sacrificial corrosion-preventive action on the steel material, the plating layer corrodes and turns into white rust before the steel material corrodes, and after the plating layer turned into white rust disappears, the steel material corrodes and red rust occurs, which is a corrosion process of the plated steel sheet.

"Appropriate current range" is a welding term, and for example, is a difference between a current value at which the diameter of the nugget formed at the central part of two laminated steel sheets that are spot-welded is $4 \times \sqrt{t}$ and a current value until dust occurs when the thickness of the plated steel sheet base is t mm. When the appropriate current range is larger, the material is evaluated as being more easily welded, and when the appropriate current range is narrower, the material is evaluated as being harder to weld because nuggets having an appropriate size are not formed. This is determined from a so-called weld-robe curve.

Regarding a continuous spotting property in spot welding, when welding in which a median value of an appropriate current range is a welding current is continuously performed without replacing the electrode, as the number of times a predetermined nugget diameter cannot be obtained in welding becomes larger, a continuous spotting property becomes better. A plated steel material having excellent continuous spotting properties is advantageous in terms of production cost.

First, a steel material to be plated will be described.

The shape of the steel material is not particularly limited as long as the steel material can be used as a material of a steel structure molded by welding such as steel pipes, civil engineering and building materials (fences, corrugated pipes, drain covers, sand prevention sheets, bolts, wire nets, guardrails, water cut-off walls, etc.), prefabricated/housing wall/roofing materials, home appliance components (such as housings for outdoor units of air conditioners), automobile outer panels, and parts other than steel sheets (suspension components, etc.).

The material of the steel material is not particularly limited. For the steel material, for example, various steel materials such as general steels, Ni pre-plated steels, Al killed steels, ultra-low carbon steels, high carbon steels, various high-tensile steels, and some high-alloy steels (such as steels containing strengthening elements such as Ni and Cr) can be applied. In addition, the steel material is not particularly limited in terms of conditions such as a steel material producing method and a steel sheet producing method (a hot rolling method, a pickling method, a cold rolling method, etc.). In addition, for the steel material, a steel material in which a metal film or alloy film of less than 1 μm such as Zn, Ni, Sn, or an alloy thereof is formed may be used.

Next, the plating layer will be described. The plating layer according to the present embodiment includes a Zn—Al—Mg-based alloy layer. In addition, the plating layer may include an Al—Fe alloy layer. The Zn—Al—Mg-based alloy layer in which alloy elements such as Al and Mg are added to Zn improves corrosion resistance as compared with a general Zn plating layer. For example, the Zn—Al—Mg-based alloy layer has corrosion resistance equivalent to that of the Zn plating layer even if it has a thickness that is about half that of a general Zn plating layer. Therefore, the plating layer of the present embodiment also has corrosion resistance equal to or higher than the Zn plating layer.

The Zn—Al—Mg-based alloy layer is made of a Zn—Al—Mg-based alloy. The Zn—Al—Mg-based alloy means a ternary alloy containing Zn, Al and Mg.

The Al—Fe alloy layer is an interface alloy layer between the steel material and the Zn—Al—Mg alloy layer.

That is, the plating layer according to the present embodiment may have a single-layer structure of a Zn—Al—Mg alloy layer or may have a laminated structure having a Zn—Al—Mg alloy layer and an Al—Fe alloy layer. In the case of a laminated structure, the Zn—Al—Mg alloy layer may be a layer constituting the surface of the plating layer. However, an oxide film of elements constituting the plating layer is formed with a thickness of about less than 1 μm on the outmost surface of the plating layer, but it is thinner than the thickness of the entire plating layer and thus it is often negligible from the main body of the plating layer.

The thickness of the entire plating layer is preferably 5 to 70 μm. Generally, the thickness of the plating layer is a point that affects the weldability in spot welding and a plating layer of usually 20 μm or more is unsuitable for welding. However, the plated steel material of the present embodiment can widen the appropriate current range during spot welding so that welding is possible even if the thickness of the plating layer is at a maximum of 70 μm. Therefore, the thickness of the plating layer is preferably 70 μm or less. In addition, if the thickness of the plating layer is less than 5 μm, since the corrosion resistance is lowered, the plating layer may be 5 μm or more.

The thickness of the Al—Fe alloy layer when the plating layer includes the Al—Fe alloy layer is about several tens of nm to 5 μm, which is lower than a thickness that is about 1/10 of the thickness of the upper Zn—Al—Mg alloy layer. The Al—Fe alloy layer improves peeling resistance of the plating layer by combining the steel material and the Zn—Al—Mg-based alloy layer. The thickness of the interface alloy layer (Al—Fe alloy layer) can be arbitrarily controlled according to a plating bath temperature and a plating bath immersion time when the plated steel material is produced. Usually, since the melting point of the Al—Fe alloy layer is higher than that of the upper Zn—Al—Mg-based alloy layer, the influence on the overall weldability is small, and there is no problem in forming an Al—Fe alloy layer having such a thickness.

Here, since the thickness of the entire plating layer depends on plating conditions, the thickness of the entire plating layer is not limited to a range of 5 to 70 μm. The thickness of the entire plating layer is affected by the viscosity and specific gravity of the plating bath in a general hot dip plating method. Then, the thickness of the entire plating layer is adjusted according to the drawing rate of the steel material (plating base sheet) and the intensity of wiping.

The Al—Fe alloy layer is formed on the surface of the steel material (specifically, between the steel material and the Zn—Al—Mg alloy layer) and is a layer whose main phase is the $Al_5Fe$ phase as a structure. The Al—Fe alloy layer is formed by mutual atom diffusion between the base iron (steel material) and the plating bath. When a hot dip plating method is used as a production method, an Al—Fe alloy layer is easily formed in the plating layer containing the Al element. Since the plating bath contains Al at a certain concentration or more, the $Al_5Fe$ phase whose proportion is the largest is formed. However, some time is taken for atom diffusion and there are parts in which the Fe concentration is high in parts close to the base iron. Therefore, the Al—Fe alloy layer may partially contain a small amount of an AlFe phase, an $Al_3Fe$ phase, an $Al_5Fe_2$ phase or the like. In addition, since the plating bath contains Zn at a certain concentration, the Al—Fe alloy layer also contains a small amount of Zn.

When the plating layer contains Si, Si is particularly likely to be incorporated into the Al—Fe alloy layer, and may form an Al—Fe—Si intermetallic compound phase. The identified intermetallic compound phase includes an AlFeSi phase, and $\alpha$, $\beta$, q1, and q2-AlFeSi phases and the like are present as isomers. Therefore, in the Al—Fe alloy layer, these AlFeSi phases and the like may be detected. The Al—Fe alloy layer containing these AlFeSi phases and the like is also called an Al—Fe—Si alloy layer.

Next, the average chemical composition of the plating layer will be described. When the plating layer has a single-layer structure of a Zn—Al—Mg alloy layer, the average chemical composition of the entire plating layer is an average chemical composition of the Zn—Al—Mg alloy layer. In addition, when the plating layer is a laminated structure of an Al—Fe alloy layer and a Zn—Al—Mg alloy layer, the average chemical composition of the entire plating layer is an average chemical composition of a total of an Al—Fe alloy layer and a Zn—Al—Mg alloy layer.

Usually, in the hot dip plating method, the chemical composition of the Zn—Al—Mg alloy layer is almost the same as that of the plating bath because the formation reaction of the plating layer is almost completed in the plating bath. In addition, in the hot dip plating method, the Al—Fe alloy layer is formed and grown instantaneously immediately after immersion in the plating bath. Furthermore, the Al—Fe alloy layer completes its formation reaction in the plating bath, and its thickness is often sufficiently smaller than that of the Zn—Al—Mg alloy layer. Therefore, unless a special heat treatment such as a heat alloying treatment is performed after plating, the average chemical composition of the entire plating layer is substantially equal to the chemical composition of the Zn—Al—Mg alloy layer and components such as the Al—Fe alloy layer are negligible.

Hereinafter, elements contained in the plating layer will be described. According to the selection of elements in the plating layer, the melting point of the plating bath, that is, ease of melting, is determined, and corrosion resistance of plating itself is also determined. In addition, the properties of the respective elements determine the electrical conductivity and thermal conductivity related to spot welding properties, and an approximate appropriate current range is determined according to a combination of these elements so that it is necessary to thoroughly examine the selection of elements and the range of their composition concentrations in order to determine the weldability.

Zn: More than 50.00%

Zn is a metal with a low-melting point, and is present as a main phase of the plating layer on the steel material. The reason why the weldability of the plated steel material is worse than that of a steel material having no plating layer is that Zn reacts with the electrode and causes a change in the current state between the electrode and the plating layer. Usually, copper electrodes are often used as spot welding electrodes, and when Zn and copper (Cu) are exposed to intense heat, a reaction occurs. This reactivity is weak compared to the case of Cu and Al. This is speculated to be because Al—Cu relates to the formation of a eutectic composition. On the other hand, Zn is an element necessary to secure corrosion resistance and obtain a sacrificial corrosion-preventive action on the steel material. If the amount of Zn is 50.00% or less, the main body of the metal structure of the Zn—Al—Mg alloy layer is an Al phase, and the Zn phase that exhibits sacrificial corrosion resistance is insufficient. Therefore, the amount of Zn is set to be more than 50.00%. More preferably, it is 65.00% or more or 70.00% or more. Here, the upper limit of the amount of Zn is an amount of elements excluding Zn and the remainder other than impurities.

Al: More than 4.0% and Less than 15.0%

Like Zn, Al is an element that constitutes the main body of the plating layer. Al has a weak sacrificial corrosion-preventive action and when the plating layer contains Al, corrosion resistance of the flat part is improved. In addition, because Mg cannot be stably retained in the plating bath if there is no Al, Al is added to the plating bath as an element that is essential for production.

Al contained in the plating layer reacts with the copper electrode during spot welding. The reaction product becomes an Al—Cu-based intermetallic compound, which deteriorates the conductivity and shortens the electrode lifespan. In the present embodiment, as a method of minimizing the influence of Al, dissolving a relatively large amount of Zn in the Al phase in the metal structure of the plating layer to form an Al—Zn phase or lowering the reactivity with the copper electrode by increasing the crystal particle size of the $MgZn_2$ phase is realized. Details will be described below.

The amount of Al is set to be more than 4.0% because it is necessary to contain a large amount of Mg to be described below or to secure corrosion resistance to some extent. If the amount of Al is equal to or lower than this content, it is difficult to build a bath as a plating bath and it is difficult to secure corrosion resistance after spot welding. In addition, the amount of Al is set to be less than 15.0% because, if the amount of Al exceeds this level, the concentration of the Al phase in the plating layer increases, the electrical conductivity and thermal conductivity increase, and additionally, $Al_2O_3$ is easily formed on the surface of the plating layer. When $Al_2O_3$ is formed on the surface of the plating layer, the reactivity with the electrode becomes active during spot welding, the current value may become unstable, and there is a risk of the appropriate current range being narrowed. Therefore, in consideration of the reaction with the electrode during spot welding, the upper limit is less than 15.0%. More preferably, the amount of Al is 5.0% or more and less than 15.0%, and may be more than 5.0% and 10.0% or less or 6.0% or more and 8.0% or less.

Mg: More than 3.2% and Less than 12.5%

Mg is an element that has a sacrificial corrosion-preventive effect and improves corrosion resistance of the plating layer. If a certain amount or more of Mg is contained, a $MgZn_2$ phase is formed in the plating layer. If the amount of Mg in the plating layer is larger, a larger amount of the $MgZn_2$ phase is formed. The melting point of the $MgZn_2$ phase is a temperature higher than the melting point of the Zn phase, and if the plating layer contains a large amount of the $MgZn_2$ phase, the reactivity between Zn and the electrode becomes poor. That is, since Zn bound to Mg has a higher melting point, the reactivity with the electrode is lowered accordingly. Therefore, the lifespan of the electrode is prolonged. In addition, since Mg is easily oxidized, Mg slightly melted during spot welding is immediately oxidized to form a MgO oxide with a certain thickness. Such an oxidation tendency is stronger than that of Al and Zn.

Therefore, when spot welding is performed at several points on the plating layer containing an appropriate amount of Mg, the surface of the electrode is covered with a thin oxide film, the state between the surface of the plating layer and the electrode is constantly stable, and the current value is stable. In addition, this oxide film serves as a barrier for reactive welding and reaction between the electrode and the plating layer, and can significantly improve the lifespan of the copper electrode.

The amount of Mg is set to be more than 3.2% because it is necessary to inactive Zn into the plating layer during welding. If the amount of Mg is 3.2% or less, the reactivity between Zn and the copper electrode becomes active, and the appropriate current value is narrowed. On the other hand, if the amount of Mg is excessive, since it becomes difficult to produce the plating layer, the upper limit is less than 12.5%. More preferably, the amount of Mg is more than 5.0% and less than 12.5%, and may be more than 5.0% and 10.0% or less or 5.0% or more and 8.0% or less. In addition, the amount of Mg is preferably 6.0% or more. If the amount of Mg is 6.0% or more, it is possible to further improve corrosion resistance.

[Mg]/[Al]≥0.80

In mass %, when the amount of Mg is [Mg] (or % Mg) and the amount of Al is [Al] (or % Al), there is a suitable ratio for [Mg]/[Al] (or % Mg/% Al) which is a ratio of the amount of Al and the amount of Mg. If [Mg]/[Al]≥0.80 is satisfied, the Al phase is unlikely to be precipitated as a coagulation structure of the plating layer during production. If [Mg]/[Al] is less than 0.80, the Al phase precipitates in the plating layer, the reactivity with the electrode increases, and the appropriate current value is reduced. Therefore, [Mg]/[Al] is 0.80 or more. Here, [Mg] and [Al] in [Mg]/[Al] are the average composition (mass %) of each element in the plating layer. [Mg]/[Al] may be 1.00 or more or 1.10 or more.

Element Group A

Sn: 0% or more and less than 3.00%
Bi: 0% or more and less than 1.00%
In: 0% or more and less than 1.00%

The plating layer may contain elements of the element group A. The effects of Sn, Bi and In in the element group A during spot welding are not strong. On the other hand, these elements have a function of improving corrosion resistance around the spot-welded part. However, since these elements tend to bond more strongly with Mg than with Zn and the effect of Mg contained is reduced, there are upper limits for the contents of these elements. If the upper limit is exceeded, the amount of adhered dross and the like increases, and the weldability also tends to deteriorate. Therefore, the amount of Sn is 0% or more and less than 3.00% and more preferably 0.01% or more and less than 3.00%. The amount of Sn may be 2.50% or less. The amount of Bi is 0% or more and less than 1.00% and more preferably 0.01% or more and less than 1.00%. The amount of Bi may be 0.80% or less. The amount of In is 0% or more and less than 1.00% and more preferably 0.01% or more and less than 1.00%. The amount of In may be 0.80% or less.

Element Group B

Ca: 0% or more and less than 2.00%
Y: 0% or more and less than 0.50%
La: 0% or more and less than 0.50%
Ce: 0% or more and less than 0.50%
Sr: 0% or more and less than 0.50%

The plating layer may contain elements of the element group B. Ca, Y, La, Ce, and Sr in the element group B are elements that contribute most to spot welding performance. Ca is the most oxidizable element in the atmosphere. Like Mg, a small amount of molten Ca immediately forms an oxide film which covers the surface of the copper electrode. Therefore, Ca has an effect of serving as a barrier for the Zn phase and Al phase reacting in the plating layer, and the appropriate current range tends to be wider.

Like Ca, Y, La, Ce, and Sr also have an effect of being oxidized in the atmosphere. In order to preferably exhibit such an effect, more preferably, the amount of these elements is more than 0% and more preferably 0.01% or more. In particular, if the amount of Ca is 0.01% or more, an Al—Ca—Si-based or Ca—Al—Zn-based compound is easily formed. These compounds become crystal nuclei during coagulation of the plating layer, serve as starting points for growth of the MgZn$_2$ phase, and promote formation of the coarse MgZn$_2$ phase. Y, La, Ce, and Sr produce similar compounds (Ca-substituted compounds) and have the same effect. However, there are upper limits for the contents of the respective elements, and if the upper limits of the contents are exceeded, it tends to be difficult to build a plating bath. In addition, the amount of adhered dross and the like increases, and the weldability also tends to deteriorate. Therefore, Ca is 0% or more and less than 2.00%, preferably more than 0% and less than 2.00%, and more preferably 0.01% or more and less than 2.00%. The amount of Ca is preferably less than 1.00%. The amount of Ca is more preferably 0.95% or less. In addition, the amount of each of Y, La, Ce, and Sr is 0% or more and less than 0.50%, preferably more than 0% and less than 0.50%, and more preferably 0.01% or more and less than 0.50%. The amount of each of Y, La, Ce, and Sr may be 0.40% or less.

Element Group C

Si: 0% or more and less than 2.50%
B: 0% or more and less than 0.50%
P: 0% or more and less than 0.50%

The plating layer may contain elements of the element group C. Si, B and P in the element group C are elements belonging to semimetals. These elements also generally form intermetallic compounds containing Zn and Al in the plating layer. As a result, it becomes difficult for the plating layer to melt, and the reactivity of the plating layer with the electrode is lowered. That is, the appropriate current range tends to be wider. However, these elements, unlike Mg and Ca, do not have an effect of forming a coating on the surface of the electrode. There are upper limits for the contents of the respective elements, and if the upper limits of the contents are exceeded, the amount of adhered dross and the like increases, and the weldability also tends to deteriorate. Therefore, the amount of Si is 0% or more and less than 2.50%, and preferably 0.01% or more and less than 2.50%. The amount of Si may be 2.00% or less. The amount of each of B and P is preferably 0% or more and less than 0.50%. More preferably, the amount of each of B and P is 0.01% or more and less than 0.50%. The amount of each of B and P may be 0.40% or less.

Element Group D

Cr: 0% or more and less than 0.25%
Ti: 0% or more and less than 0.25%
Ni: 0% or more and less than 1.0%
Co: 0% or more and less than 0.25%
V: 0% or more and less than 0.25%
Nb: 0% or more and less than 0.25%
Cu: 0% or more and less than 0.40%
Mn: 0% or more and less than 0.25%
Fe: 0% or more and less than 5.00%

The plating layer may contain elements of the element group D. Cr, Ti, Ni, Co, V, Nb, Cu, Mn and Fe in the element group D are metal elements, and when these elements are incorporated into the plating layer, a substitutional solid solution and a new intermetallic compound with a high-melting point are formed. Therefore, the plating layer becomes difficult to melt and the reactivity of the plating layer with the copper electrode is lowered. That is, the appropriate current range tends to be wider. However, these elements, unlike Mg and Ca, do not have an effect of forming a coating on the surface of the electrode, and have a weaker effect of improving spot welding properties than Mg and Ca. In particular, when there is at least one element within the element group B, a clear effect cannot be confirmed. On the other hand, when the element group B, the element group C and the element group D are used together, the appropriate current range during spot welding further widens. There are upper limits for the contents of the respective elements, and if the upper limits of the contents are exceeded, the amount of adhered dross and the like increases, and the weldability also tends to deteriorate. Therefore, the amount of each of Cr, Ti, Co, V, Nb, and Mn is 0% or more and less than 0.25% and preferably 0.01% or more and less than 0.25%. The amount of each of Cr, Ti, Co, V, Nb, and Mn may be 0.23% or less. The amount of Ni is 0% or more and less than 1.0% and preferably more than 0% and less than 1.0%. The amount of Ni may be 0.01% or more. The amount of Ni may be 0.8% or less. The amount of Cu is 0% or more and less than 0.40%, and preferably more than 0% and less than 0.40%. The amount of Cu may be 0.01% or more. The amount of Cu may be 0.35% or less. In addition, Fe may be inevitably contained in the plating layer. This is because Fe may diffuse from the base iron into the plating layer during plating production. Therefore, the amount of Fe is 0% or more and less than 5.00% and may be more than 0% and less than 5.00%. The amount of Fe may be 0.01% or more. The amount of Fe may be 4.50% or less.

Element Group E
  Sb: 0% or more and less than 0.5%
  Pb: 0% or more and less than 0.5%

The plating layer may contain elements of the element group E. Sb and Pb in the element group E are elements having properties similar to those of Zn. Therefore, when these elements are contained, a special effect in spot welding properties is hardly exhibited. However, these elements have effects such as facilitating the formation of a spangle pattern in the appearance of the plating. However, if these elements are excessively contained, corrosion resistance after spot welding may decrease. Therefore, the amount of each of Sb and Pb is 0% or more and less than 0.5% and preferably 0.01% or more and less than 0.5%. The amount of each of Sb and Pb may be 0.40% or less.

Remainder: More than 50.00% of Zn and Impurities

Of the remainder, Zn is as described above. In addition, impurities in the plating layer are components contained in raw materials or components that are mixed in during production processes, which are unintentionally incorporated components. For example, in the plating layer, a very small amount of components other than Fe is mixed in as impurities according to mutual atomic diffusion between the steel material (base iron) and the plating bath.

In order to identify the average chemical composition of the plating layer, an acid solution is obtained by peeling and dissolving the plating layer with an acid containing an inhibitor that minimizes corrosion of the base iron (steel material). Next, the chemical composition can be obtained by measuring the obtained acid solution by an ICP optical emission spectrometry method or an ICP-MS method. The type of acid is not particularly limited as long as it is an acid that can dissolve the plating layer. If the area and weight before and after peeling are measured, the amount of adhered plating ($g/m^2$) can be obtained at the same time.

Next, a structure of the plating layer will be described.

The proportion and size of the phases contained in the plating layer greatly influence spot welding properties of the plating layer. Even if the plating layers have the same component composition, the phase or structure contained in the metal structure changes depending on the production method, resulting in different properties. The metal structure of the plating layer can be easily confirmed under a scanning electron microscope (SEM-EDS) with an energy-dispersive X-ray spectrometer. In an arbitrary vertical cross section (thickness direction) of the plating layer that is mirror-finished, for example, when a reflected electron image is obtained, the state of the approximate metal structure of the plating layer can be confirmed. Since the thickness of the plating layer of the present embodiment is about 5 to 70 μm, it is preferable to confirm the metal structure under an SEM in a field of view of 500 to 5,000 times. For example, when the plating layer having a thickness of 25 μm is observed at a magnification of 25,000 times, the cross section of the plating layer in an area of 25 μm (plating thickness)×40 μm (width of SEM field of view)=1,000 μm² per one field of view can be confirmed. In the case of the present embodiment, for the field of view of the SEM of the plating layer, since a local field of view can be observed, in order to obtain average information of the plating layer, average information may be obtained by selecting 25 points of fields of view from an arbitrary cross section. That is, the metal structure in a total field of view of 25,000 μm² can be observed, and the area fraction and size of the phase or structure constituting the metal structure of the plating layer may be determined.

A reflected electron image obtained using the SEM is preferable because the phase or structure contained in the plating layer can be easily determined. Since an element with a small atomic number such as Al is imaged in black and an element with a high atomic number such as Zn is imaged in white, the proportions of these structures can be easily read.

For confirmation of each phase, in EDS analysis, the composition of the phase may be confirmed with pinpoint, and the phase may be determined by reading substantially the same component phase from element mapping. EDS analysis can be used to determine the phase with almost the same composition by element mapping. If a phase with almost the same composition can be determined, it is possible to identify an area of the crystal phase in the observation field of view. Once the area is known, the average crystal particle size can be calculated by determining the circle-equivalent diameter by computation. The circle-equivalent diameter refers to the diameter of a perfect circle corresponding to the area.

In addition, it is possible to obtain an area proportion of each phase in the observation field of view. The area fraction of a specific phase in the plating layer corresponds to the volume fraction of the phase in the plating layer.

Figure 2:
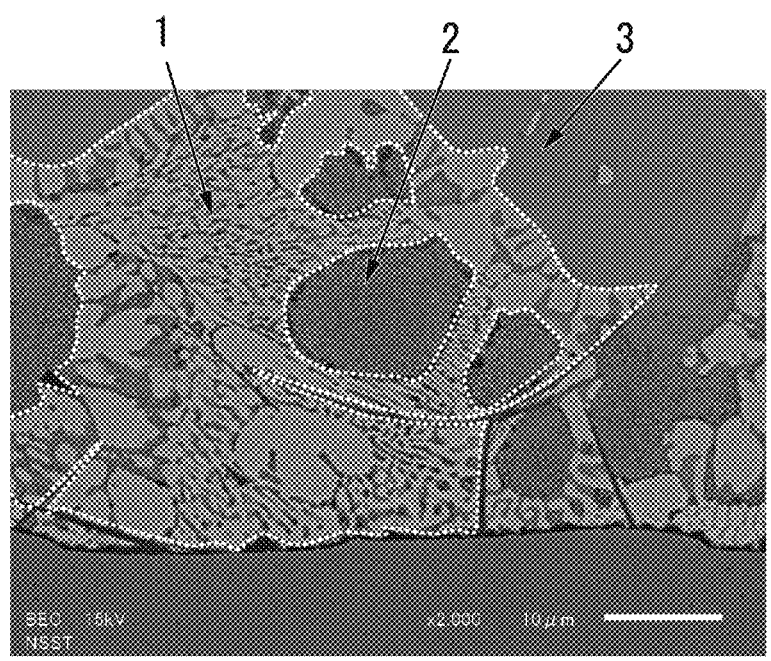
FIG. 2 is an enlarged image of FIG. 1.
Figure 3:
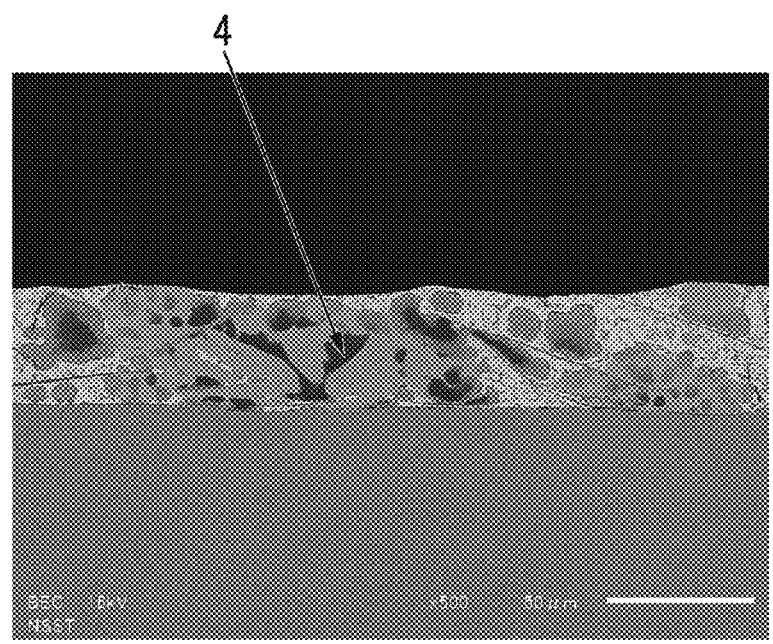
FIG. 3 shows an SEM reflected electron image of a vertical cross-sectional structure of a plating layer of test No. 21 (example).

Hereinafter, the phase and structure contained in the plating layer will be described. FIG. 1, FIG. 2 and FIG. 3 show images of a metal structure of a representative plating layer in the present invention.

When the metal structure of the plating layer of the present embodiment is observed under the SEM in a total field of view of 25,000 μm², it contains 10 to 40 area % of a $MgZn_2$ phase, 10 to 30 area % of an Al—Zn phase with a Zn content of 10% or more, 0 to 15 area % of an Al phase with a Zn content of less than 10%, and an 25 area % or more of an eutectic structure composed of an Al phase, a $MgZn_2$ phase and a Zn phase [Al/$MgZn_2$/Zn ternary eutectic structure]. The above phases and structures constitute the main phase of the plating layer and occupy 90% or more in the area fraction of the plating layer.

$MgZn_2$ Phase

The $MgZn_2$ phase according to the present embodiment is an area of the plating layer in which there is 16 mass % (+5%) of Mg and 84 mass % (±5%) of Zn. The $MgZn_2$ phase is often imaged gray, which is an intermediate color between Al and Zn in the SEM reflected electron image. In the SEM reflected electron image, the $MgZn_2$ phase can be clearly distinguished from the Al—Zn phase and the Al phase, the [Al/$MgZn_2$/Zn ternary eutectic structure] and the like, and is a phase indicated by reference numeral 3 in FIG. 1 and FIG. 2.

In the component composition of the plating layer in the present embodiment, an amount of a massive $MgZn_2$ phase increases. When there is a large amount of the $MgZn_2$ phase, the appropriate current range tends to increase during spot welding. When there is a large amount of the $MgZn_2$ phase, the proportion of the Zn phase contained in the [Al/$MgZn_2$/Zn ternary eutectic structure] is relatively reduced, and the reactivity between the plating layer and the electrode of a spot welding machine can be reduced. In addition, during spot welding, a small amount of the $MgZn_2$ phase is dissolved, and Mg is oxidized in the atmosphere to form a Mg-based oxide layer on the surface of the copper electrode. This coating is formed within the first 10 spots of the electrode, the appropriate current value after that is stabilized and it is difficult for the reaction of the electrode to proceed.

The area fraction of the $MgZn_2$ phase in the plating layer is 10% or more. As the amount of Mg in the plating layer increases, the volume fraction of the $MgZn_2$ phase increases and spot welding properties are improved. 15% or more, 20% or more or 30% or more is more preferable. The upper limit of the area fraction of the $MgZn_2$ phase is 40% or less. Within the range of the average chemical composition of the plating layer, it is difficult to increase the area fraction of the $MgZn_2$ phase to more than 40%. Here, in the present embodiment, $MgZn_2$ contained in the [Al/$MgZn_2$/Zn ternary eutectic structure] is not included in the area fraction of the $MgZn_2$ phase.

When the $MgZn_2$ phase in the plating layer grows to a larger size, it is possible to further improve the continuous spotting property among the spot welding properties of the plating layer. In addition, since the phase having excellent corrosion resistance remains even after spot welding, corrosion resistance is also improved. In order to grow the $MgZn_2$ phase, it is preferable to contain one or more elements selected from the element group B, and the $MgZn_2$ phase growth effect can be confirmed from the fact that the amount of at least one or two or more elements of the element group B is 0.01% or more. The $MgZn_2$ phase with a large grain size is preferable to the $MgZn_2$ phase with a fine grain size because it is less likely to be dissolved with input heat during spot welding and less likely to react with the electrode.

When the plating layer is observed in a total observation field of view of 25,000 $\mu m^2$ using an electron microscope, if the average crystal grain size of the top 80% massive $MgZn_2$ phase particles having the largest crystal particle size as the average circle-equivalent diameter is 30 $\mu m$ or more, the $MgZn_2$ phase present finely in the plating layer and the $MgZn_2$ phase present in the [Al/$MgZn_2$/Zn ternary eutectic structure] tend to aggregate or decrease. Thereby, spot welding properties are improved. In addition, after spot welding, a large amount of the plating layer remains around the welded part and thus corrosion resistance around the welded part is also improved. That is, when the area fraction of the $MgZn_2$ phase is large, the average crystal particle size is large, and additionally, when elements in the element group A are used in combination, corrosion resistance around the spot-welded part is significantly improved. Here, the above 80% is the number percentage with respect to the total number of counted $MgZn_2$ phases. That is, when the number of measured $MgZn_2$ phases is N, the average circle-equivalent diameter of the 0.8×N (80%) $MgZn_2$ phase particles having the largest crystal particle size in descending order may be 30 $\mu m$ or more.

Al Phase

The Al phase in the present embodiment is an area of the plating layer in which the amount of Al is 90 mass % or more and preferably more than 90 mass %. The area indicated by reference numeral 4 in FIG. 3 is the Al phase. The Al phase may contain Zn, but the amount of Zn is less than 10%. The Al phase can be clearly distinguished from other phases and structures in the SEM reflected electron image. That is, the Al phase is often shown in blackest in the SEM reflected electron image. In the present embodiment, the Al phase has various forms such as a block shape or appears as a dendritic cross section such as a circular or flat shape in an arbitrary cross section. The Al phase is the phase indicated by reference numeral 4 in FIG. 3. Here, in the present embodiment, Al contained in the [Al/$MgZn_2$/Zn ternary eutectic structure] is not included in the area fraction of the Al phase.

The Al phase reduces spot welding properties. When the Al phase appears on the surface of the plating layer, it forms a thin film insulating coating such as $Al_2O_3$ which reduces the appropriate current range, also reacts with the copper electrode, forms an Al—Cu-based intermetallic compound with the electrode, significantly reduces the electrode lifespan, and deteriorates the continuous spotting property. If the area fraction of the Al phase is 15% or less, the electrode lifespan tends to be longer in spot welding and thus the area fraction of the Al phase is 15 area % or less. The area fraction is preferably 10 area % or less, more preferably 5 area % or less, and still more preferably 0 area %.

Here, since the continuous spotting property improving effect is weak only by reducing the Al phase, it is preferable to set the area fraction of the Al phase to 15 area % or less and the area fraction of the $MgZn_2$ phase to 10 area % or more.

Al—Zn Phase

The Al—Zn phase in the present embodiment is a phase containing 10 mass % or more of Zn and Al. The Al—Zn phase is an aggregate of a fine Zn phase with a grain size of about 1 $\mu m$ (hereinafter referred to as a fine Zn phase) and a fine Al phase with a grain size of less than 1 $\mu m$ (hereinafter referred to as a fine Al phase), and is the phase indicated by reference numeral 2 in FIG. 1 and FIG. 2. In the molten plating layer, Al has a different structure from the crystal structure at room temperature and can dissolve a large amount of a Zn phase and is present as a high-temperature stable phase containing about 50% of a Zn phase. On the other hand, at room temperature, the amount of the Zn phase in the high-temperature stable phase is extremely reduced, and Al and Zn are equilibrium-separated and present as an Al—Zn phase containing a fine Al phase and a fine Zn phase. That is, the Al—Zn phase is a phase containing 10 to 80 mass % of a fine Zn phase. Since the Al—Zn phase has different properties from the Al phase and the Zn phase contained in the plating layer, it is distinguished in the reflected electron SEM image and wide-angle X-ray diffraction. In wide-angle X-ray diffraction, for example, it is said to have specific diffraction peaks such as $Al_{0.403}Zn_{0.597}$ (JCODF #00-052-0856) and $Al_{0.71}Zn_{0.29}$ (PDF #00-019-0057). Therefore, in the present embodiment, the phase containing 90 to 20 mass % of an Al component and 10 to 80 mass % of a Zn component is an Al—Zn phase. When the area of the Al—Zn phase is surrounded with a closed space, it is also possible to define the crystal size of the Al—Zn phase.

The Al phase is very highly reactive to the welding electrode and makes the weldability extremely unstable. On the other hand, when included in the Al—Zn phase as a fine Al phase together with a fine Zn phase, a thin coating such as an $Al_2O_3$ oxide film that adversely affects the weldability is not formed on the surface of the plating layer, and the weldability is improved as a result.

In the present embodiment, since the plating layer contains Al at a certain concentration or more, depending on production conditions, 10 to 30% or more of an Al phase is formed, but it is possible to inhibit formation of a massive or dendritic Al phase by carefully selecting the production method and allow them to present as an Al—Zn phase. That is, if the amount of the Al—Zn phase increases, the amount of the Al phase can be reduced. In addition, compared to the Al phase, the Al—Zn phase is less likely to react with the copper electrode and tends to widen the appropriate current range. Therefore, in consideration of the weldability, it is more convenient to incorporate Zn into the Al phase as much as possible to form an Al—Zn phase than to allow the Al phase to remain in the plating layer.

The area fraction of the Al—Zn phase in the plating layer is in a range of 10 to 30 area %. If the area fraction of the Al—Zn phase is less than 10 area %, the area fraction of the Al phase with a Zn content of less than 10 mass % relatively increases, the continuous spotting property during spot welding deteriorates, and the appropriate current range is narrowed, and on the other hand, within the range of the average chemical composition of the plating layer, since it is difficult to increase the area fraction of the Al—Zn phase to more than 30%, the upper limit of the area fraction of the Al—Zn phase is 30 area % or less.

[Al/MgZn$_2$/Zn Ternary Eutectic Structure]

The [Al/MgZn$_2$/Zn ternary eutectic structure] is a eutectic structure composed of an Al phase, a MgZn$_2$ phase and a Zn phase, and is clearly distinguished from the MgZn$_2$ phase contained as the main phase of the plating layer and the above Al phase in the reflected electron SEM image. The [Al/MgZn$_2$/Zn ternary eutectic structure] is the structure indicated by reference numeral 1 in FIG. 1 and FIG. 2.

The [Al/MgZn$_2$/Zn ternary eutectic structure] contains a Zn phase. The Zn phase is an area with a Zn concentration of 95 mass % or more. The Zn phase in the [Al/MgZn$_2$/Zn ternary eutectic structure] is often imaged whitest in the SEM reflected electron image. In the component composition of the present embodiment, the [Al/MgZn$_2$/Zn ternary eutectic structure] is formed according to a eutectic reaction, and most of the Zn phase is coagulated in the eutectic reaction so that it is present in the eutectic structure. The Zn phase has a smaller degree of influence than the Al phase, but reacts with the copper electrode during spot welding, and adversely affects the lifespan of continuous spot.

On the other hand, if the area fraction of the [Al/MgZn$_2$/Zn ternary eutectic structure] is less than 25 area %, the Zn phase decreases as the area fraction decreases, sacrificial corrosion resistance of the plating layer decreases and corrosion resistance cannot be maintained. Therefore, it is necessary to set the area fraction of the [Al/MgZn$_2$/Zn ternary eutectic structure] to be 25 area % or more. That is, if there is a certain level of the [Al/MgZn$_2$/Zn ternary eutectic structure] containing a Zn phase, sacrificial corrosion resistance is secured and corrosion resistance around the welded part is improved. In addition, Al in the plating layer is incorporated into the [Al/MgZn$_2$/Zn ternary eutectic structure], the area fraction of the Al phase not contained in the [Al/MgZn$_2$/Zn ternary eutectic structure] is reduced, and the continuous spotting property is improved. The upper limit of the area fraction of the [Al/MgZn$_2$/Zn ternary eutectic structure] is not particularly limited, and may be 80 area % or less, 75 area % or less, 70 area % or less, or 65 area % or less.

In the plating layer of the present embodiment, the area fraction of the quasicrystalline phase is preferably 4% or less. Here, the quasicrystalline phase is defined as a phase in which the amount of Mg, the amount of Zn and the amount of Al satisfy, in atom %, $0.5 \leq Mg/(Zn+Al) \leq 0.83$. That is, it is defined as a quasicrystalline phase in which Mg:(Zn+Al), which is a ratio between Mg atoms and a total of Zn atoms and Al atoms, is 3:6 to 5:6. As a theoretical ratio, Mg:(Zn+Al) is considered to be 4:6. The chemical components of the quasicrystalline phase are preferably calculated by quantitative analysis using transmission electron microscope-energy dispersive X-ray spectroscopy (TEM-EDX) or quantitative analysis using electron probe micro-analyzer (EPMA) mapping. Here, it is not easy to define a quasicrystal by an exact chemical formula like an intermetallic compound. This is because, in the quasicrystalline phase, repeating lattice units cannot be defined like unit lattices of crystals, and additionally, it is difficult to determine atom positions of Zn and Mg.

The quasicrystalline phase is a crystal structure that was first discovered by Daniel Shuchtmann in 1982, and has an icosahedron atom arrangement. This crystal structure is an aperiodic crystal structure having unique rotational symmetry, for example, five-fold symmetry, which cannot be obtained with general metals and alloys, and is known as a crystal structure equivalent to an aperiodic structure represented by a three-dimensional Penrose pattern. In order to identify this metal substance, it is usually confirmed by obtaining a radial regular decagon electron beam diffraction image due to the icosahedron structure from the phase by electron beam observation according to TEM observation.

Next, a method of measuring the area fraction of the quasicrystalline phase in the plating layer will be described. An SEM reflected electron image of the plating layer is imaged. Based on the experiment results obtained by separate transmission electron microscope (TEM) observation, the quasicrystalline phase in the SEM reflected electron image is determined. In a predetermined field of view, a component mapping image is determined, the part of the same component composition as the quasicrystalline phase in the plating layer is determined, and the quasicrystalline phase in the plating layer is determined by image processing. Using an image analysis device, an image in which the range of the quasicrystalline phase area is selected is prepared, and the proportion of the quasicrystalline phase in the plating layer can be measured.

The above phases and structures constitute the main phase of the plating layer and these occupy 90% or more of the area fraction of the plating layer. On the other hand, other metal phases are formed when the plating layer contains elements other than Zn, Mg and Al. For example, Si forms a $Mg_2Si$ phase or the like, and Ca forms an Al—Zn—Ca phase or the like. Typical components of the residual structure include a $Mg_2Si$ phase, an AlZnCa phase, and an AlCaSi phase. Although some of these are effective in improving the weldability and corrosion resistance, the effect is not significant. Based on the composition of the plating layer, since it is difficult for the area fraction of these to be more than 10 area % in total, the area fraction may be 10 area % or less.

Next, a case in which the plated steel material of the present embodiment is produced by a hot dip plating method will be described. The plated steel material of the present embodiment can be produced by either an immersion type plating method (batch type) or a continuous type plating method.

The size, shape, surface form and the like of the steel material to be plated are not particularly limited. General steel materials, high-tensile steel, stainless steel and the like can be applied as long as they are steel materials. Steel strips of general structure steel are most preferable. In advance, the surface may be finished by shot blasting, brush grinding or the like, and there is no problem even if plating is performed after a metal film or alloy film of 3 $g/m^2$ or less such as Ni, Fe, Zn, Sn, or plating is adhered to the surface. In addition, as a pretreatment for the steel material, it is preferable to sufficiently wash the steel material by degreasing and pickling.

After the surface of the steel material is sufficiently heated and reduced with a reducing gas such as $H_2$, the steel material is immersed in a plating bath prepared with predetermined components. For high-tensile steel and the like, it is common to humidify the atmosphere during annealing, use an internal oxidation method and the like, and secure plating adhesion to high Si, Mn steel and the like, and when such a treatment is performed, plated steel materials with less bare spot and fewer appearance defects can be plated usually in the same manner as general steel materials. In such a steel material, the surface of the steel material with a fine crystal grain size and an internal oxide coating layer are observed on the side of the base iron, but these do not affect the performance of the present invention.

In the case of the hot dip plating method, components of the plating layer can be controlled by components of a plating bath to be prepared. A plating bath is prepared by mixing predetermined amounts of pure metals, and for example, an alloy of plating bath components is produced by a dissolution method in an inert atmosphere.

When a steel material whose surface has been reduced is immersed in a plating bath maintained at a predetermined concentration, a plating layer with substantially the same components as the plating bath is formed. If the immersion time is prolonged or it takes a long time to complete coagulation, since formation of the interface alloy layer becomes active, the Fe concentration may increase, and when the temperature is lower than 500° C., since the reaction with the plating layer rapidly slows down, the concentration of Fe contained in the plating layer is usually less than 5.00%.

For formation of a hot dip plating layer, it is preferable to keep the plating bath at 500° C. to 550° C. If the temperature of the plating bath is lower than 500° C., formation of the alloy layer becomes insufficient, and the plating adhesion during processing becomes insufficient. Therefore, the temperature of the plating bath is 500° C. or higher. Then, it is preferable to immerse the reduced steel material for a few seconds. On the surface of the reduced steel material, in some cases, Fe diffuses into the plating bath and reacts with the plating bath to form an interface alloy layer (mainly an Al—Fe-based intermetallic compound layer) at the steel material interface between the plating layer and the steel material. When the interface alloy layer is formed, the steel material below the interface alloy layer and the plating layer above the interface alloy layer are metal-chemically bonded more firmly.

After the steel material is immersed in the plating bath for a predetermined time, the steel material is pulled out of the plating bath, and when the metal adhered to the surface is melted, $N_2$ wiping is performed so that the plating layer is adjusted to have a predetermined thickness. It is preferable to adjust the thickness of the plating layer to 3 to 80 μm. The converted amount of the adhered plating layer is 10 to 500 $g/m^2$ (one side). In addition, the thickness of the plating layer may be adjusted to 5 to 70 μm. The converted adhesion amount is about 20 to 400 $g/m^2$ (one side).

After the adhesion amount of the plating layer is adjusted, the adhered molten metal is coagulated. A cooling method during plating layer solidification may be performed by spraying nitrogen, air or a hydrogen/helium mixed gas, mist cooling or immersion in water. Mist cooling is preferable, and mist cooling in which water is contained in nitrogen is preferable. The cooling rate may be adjusted according to the water content.

In the present embodiment, plating layer solidification conditions under general operation conditions are, for example, operation conditions: when cooling is performed at an average cooling rate of 5 to 20° C./sec from the temperature of the plating bath to 150° C., predetermined performance may not be satisfied because structure control is not possible in some cases. Therefore, a cooling process in which the plating layer of the present embodiment can be obtained will be described below.

Average Cooling Rate Between Bath Temperature and 380° C.

The range between the bath temperature and 380° C. is considered to be a range in which the $MgZn_2$ phase is formed. In this temperature range, coagulation of the plating layer gradually starts. In the case of the average composition of the plating layer in the present embodiment, the nucleus that first coagulates from the hot dip plating layer is the $MgZn_2$ phase excluding a very small amount of the intermetallic compound phase, which usually becomes the primary crystal. In the vicinity of 380° C., the $MgZn_2$ phase is the main phase, and other phases such as the Al—Zn phase, the Al phase, and the Zn phase are hardly formed. On the other hand, if the cooling rate is high and non-equilibrium coagulation proceeds, even in the plating composition according to the present invention, a small amount of the Al phase with a Zn content of less than 10 mass % is formed. In particular, if the Al content of the plating layer is high, the Al phase tends to be formed, and the excessive Al phase impairs the weldability as described above.

If cooling is performed at an average cooling rate of 10° C./sec or more, the Al phase occurs, and the weldability of the plating layer deteriorates. On the other hand, when cooling is performed to 380° C. at an average cooling rate of less than 10° C./sec and more preferably less than 5° C./sec, plating layer solidification approaches equilibrium coagulation and the Al phase no longer occurs. If the average cooling rate during this period is 10° C./sec or more, the $MgZn_2$ phase does not grow and the proportion of the $MgZn_2$ phase contained in the ternary eutectic structure increases and spot welding properties deteriorate.

In order to improve spot welding properties, as described above, it is preferable to grow the $MgZn_2$ phase, and the average cooling rate between the bath temperature and 380° C. is made as small as possible.

Retention Time Between 400 and 380° C.

In addition, if the time for which the temperature of the plating layer is maintained between 400 and 380° C. is set to 10 sec or more, since the $MgZn_2$ phase in the plating layer becomes coarse, the time required for the temperature to drop from 400° C. to 380° C. is desirably 10 sec or more.

In addition, during cooling between 400 and 380° C., when a high-temperature gas containing fine ZnO or $Al_2O_3$ particles with a diameter of 0.5 μm or less is sprayed, the coagulation nucleus site of $MgZn_2$ is formed, and thus the growth of the $MgZn_2$ phase can be promoted. Therefore, the average circle-equivalent diameter of the top 80% $MgZn_2$ phase particles having the largest circle-equivalent diameter among the $MgZn_2$ phase particles can be 30 μm or more.

Average Cooling Rate Between 380° C. and 300° C.

Between 380° C. and 300° C., a ternary eutectic reaction of $Al/MgZn_2/Zn$ occurs from the liquid phase, the liquid phase disappears, and the plating layer is completely coagulated. According to the amount of Al in the plating layer, the average cooling rate between 380° C. and 300° C. is regulated as follows.

(If the Amount of Al in the Plating Layer is 8% or Less)

If the amount of Al in the plating layer is 8% or less, the Al phase tends to be difficult to precipitate. In a temperature range between 380° C. and 300° C., Al is released from the Zn phase, the volume fraction of the Al—Zn phase as a high-temperature stable phase increases, and the volume fraction of the ternary eutectic of the $Zn$—$Al$—$MgZn_2$ phase is reduced. Therefore, in order to further improve corrosion resistance, the average cooling rate in the temperature range between 380° C. and 300° C. should be increased, and specifically, it is desirably more than 20° C./sec. If the cooling rate is 20° C./sec or less, the volume fraction of the ternary eutectic of the $Zn$—$Al$—$MgZn_2$ phase decreases.

(If the Amount of Al in the Plating Layer is More than 8%)

If the amount of Al in the plating layer is more than 8%, the Al phase tends to precipitate. In a temperature range between 380° C. and 300° C., the Al phase changes to the Al—Zn phase, which is a high-temperature stable phase, that is, the Zn phase formed as the $[Al/MgZn_2/Zn$ ternary eutectic structure] is incorporated again into the precipitated Al phase to a maximum extent of Al. Therefore, it is better to leave it in a temperature range between 380° C. and 300° C. for as long as possible, and in order to set the volume fraction of the Al phase with a Zn content of less than 10 mass % to be 15% or less, at least the average cooling rate needs to be 20° C./sec or less. More preferably, the average cooling rate is 5° C./sec or less, and it is more preferable to leave it in a temperature range between 380° C. and 300° C. for 20 sec or more (an average cooling rate of 4° C./sec or less).

Average Cooling Rate Between 300° C. and 150° C.

In a temperature range between 300° C. and 150° C., there is a risk of the fine Zn phase incorporated into the Al—Zn phase being discharged from the Al—Zn phase rapidly. Since atoms move more actively if the temperature is higher, it is preferable to cool this temperature range quickly. If the cooling rate between 300 and 150° C. is 20° C./sec or less, the Al—Zn phase separates into a fine Al phase and a fine Zn phase. In particular, this tendency becomes stronger if the Al concentration is higher. In order to reduce the occurrence of a massive or dendritic Al phase from the fine Al phase and set the volume fraction of the Al phase with a Zn content of less than 10 mass % to 15% or less, an average cooling rate between 300° C. and 150° C. needs to be 10° C./sec or more, and is more preferably more than 20° C./sec and still more preferably more than 50° C./sec.

Temperature Range Below 150° C.

Since the cooling rate in the temperature range below 150° C. in a coagulation procedure does not affect the configuration phase in the plating layer, there is no need to limit cooling conditions, and natural cooling may be performed.

After the plating layer is cooled, various chemical treatments and painting treatments may be performed. In addition, in order to further improve corrosion resistance, touch-up paint for repair, a spraying treatment and the like may be applied to the welded part, the processed part and the like.

In the plated steel material of the present embodiment, a coating may be formed on the plating layer. One or two or more coating layers can be formed. Examples of types of the coating directly above the plating layer include a chromate coating, a phosphate coating, and a chromate-free coating. A chromate treatment, a phosphate treatment, and a chromate-free treatment for forming these coatings can be performed by known methods. However, most chromate treatments may deteriorate the weldability on the surface of the plating layer, and in order for the weldability improvement effect to be sufficiently exhibited in the plating layer, the thickness is preferably less than 1 μm.

The chromate treatment includes an electrolytic chromate treatment in which a chromate coating is formed by electrolysis, a reactive chromate treatment in which a coating is formed using a reaction with a material and excess treatment liquid is then washed away, and a coating type chromate treatment in which a treatment liquid is applied to an object to be coated and dried without washing with water to form a coating. Any of these treatments may be used.

Examples of electrolytic chromate treatments include electrolytic chromate treatments using chromic acid, silica sol, a resin (phosphoric acid, an acrylic resin, a vinyl ester resin, a vinyl acetate acrylic emulsion, a carboxylated styrene butadiene latex, a diisopropanolamine modified epoxy resin, etc.), and hard silica.

Examples of phosphate treatments include a zinc phosphate treatment, a zinc calcium phosphate treatment, and a manganese phosphate treatment.

The chromate-free treatment is particularly suitable because it is not a burden on the environment. The chromate-free treatment includes an electrolytic chromate-free treatment in which a chromate-free coating is formed by electrolysis, a reactive chromate-free treatment in which a coating is formed using a reaction with a material and excess treatment liquid is then washed away, and a coating type chromate-free treatment in which a treatment liquid is applied to an object to be coated and dried without washing with water to form a coating. Any of these treatments may be used.

In addition, on the coating directly above the plating layer, one or two or more organic resin coating layers may be provided. The organic resin is not limited to a specific type, and examples thereof include polyester resins, polyurethane resins, epoxy resins, acrylic resins, polyolefin resins, and modified components of these resins. Here, the modified component is a resin obtained by reacting a reactive functional group contained in the structure of these resins with another compound (a monomer, cross-linking agents, etc.) containing a functional group that can react with the functional group in the structure.

As such an organic resin, a mixture of one or two or more organic resins (unmodified) may be used or a mixture of one or two or more organic resins obtained by modifying at least one other organic resin in the presence of at least one organic resin may be used. In addition, the organic resin coating may contain any color pigment or rust prevention pigment. A water-based component obtained by dissolving or dispersing in water can also be used.

Next, a method of evaluating the spot welding properties of a plated steel material and a method of evaluating corrosion resistance around the spot-welded part will be described.

<Evaluation of Appropriate Current Range>

A plurality of test pieces are prepared in order to evaluate the appropriate current range of the welding current for spot welding. As the test piece, a plated steel material including a soft steel sheet with a sheet thickness of 0.8 mm as a steel material is preferable because it is easy to evaluate the weldability of the plating layer itself. If a chemical treatment film is formed on the surface of the plating layer, a planned welded part is polished with sandpaper or the like and the chemical treatment film is peeled off. It is preferable that the adhesion amount or thickness of the plating layer in each sample be constant, and when the thickness of the plating layer is about 20 μm, the difference in spot welding properties tends to be most likely to occur and therefore the thickness of the plating layer is set to 20 sm. As a sample, a steel sheet having a plating layer formed on both sides is used. As a sample, a test piece with a size of 30×50 mm is cut out from the plated steel material.

Next, in a spot welding machine, recommended welding conditions are searched for. The electrode material is a Cu—Cr-based alloy. The shape of the electrode is a dome shape. The welding time, pressure, cooling capacity, Sq. time, Up time, Down Time and the like are adjusted, adjustment is performed for each sample, and basic welding conditions in which spot welding is possible are searched for. Regarding basic welding conditions, it is preferable to search for welding conditions that are as constant as possible even if the plated steel sheet is changed. When the basic welding conditions are found, first, in order to make the surface state of the electrode constant, temporary welding is performed at 10 spots, and welding is then performed while changing the welding current value from the low side to the high side. It is preferable to increase the current value in increments of 0.1 kA. After spot welding at each welding current, the overlapping test pieces are embedded in the resin, and the nugget diameter at the center of the spot-welded part is measured. A current value that satisfies a nugget diameter of $4\times\sqrt{t}$ (t=sheet thickness of the plated steel sheet used), which is a specified value, is set as the lower limit value of the appropriate current range. In addition, the current value at which dust occurs is set as the upper limit value of the appropriate current range. The difference between the upper limit value and the lower limit value is the appropriate current range. When a plated steel sheet has a wider appropriate current range, spot welding is easily performed, and on the other hand, when a plated steel sheet has a narrower appropriate current range, spot welding is difficult.

<Evaluation of Continuous Spotting Property>

The lifespan of the spot welding electrode also depends on the plated steel material. That is, if spot welding can be performed many times at the current value within the appropriate current range without replacing the surface of the electrode, it is possible to reduce the production cost and production time, and it can be said to be a more preferable plated steel material. Specifically, the median value of the appropriate current range is set as the welding current, and spot welding is continuously performed. If spot welding is repeatedly performed, Ca, Mg, Al, Zn and the like, which are metal elements on the surface of the plating layer, react with the electrode, and the shape of the electrode changes. The shape of the electrode can be easily measured with pressure-sensitive paper or the like during spot welding. As spot welding is performed a greater number of times, the spot welding nugget diameter gradually decreases. The number of spots when a case in which the nugget diameter is less than $2\times\sqrt{t}$ (t is the sheet thickness of the steel material) occurs continuously three times is defined as the number of continuous spots. It can be said that, as this value becomes larger, the electrode wears less and the plated steel material has a better continuous spotting property.

<Corrosion Resistance Around Spot-Welded Part>

Two plated steel sheets with a size of 70×150 mm and a size of 30×75 mm are produced, and their central parts are made to overlap to form two spot-welded parts at positions 20 mm away from the central parts. The nugget diameter is adjusted to $4\sqrt{t}$ or more (T is the sheet thickness of the steel material). Accordingly, an overlapping test piece is produced. A plated steel sheet with a size of 70×150 mm is repaired with an epoxy-based resin paint only on the end part, and is directly put into a corrosion testing machine. After a predetermined time has passed in the corrosion testing machine, corrosion occurs most easily in the overlapping part and therefore the red rust occurrence status is checked in a divided manner. If a period until red rust occurs is longer, it is determined that the corrosion resistance around the welded part is high and the sample is more suitable as a spot welding material.

EXAMPLES

As shown in Table 1A to Table 4B, plated steel materials were produced, and performance was evaluated. The $MgZn_2$ area, the Al—Zn phase area, the Al phase area, the quasicrystalline phase area, and the residual area shown in Table 4A and Table 4B were evaluated by the above measurement methods. In addition, the average circle-equivalent diameter shown in Table 4A and Table 4B is the average circle-equivalent diameter of the top 80% $MgZn_2$ phase particles having the largest circle-equivalent diameter among the $MgZn_2$ phase particles of the metal structure in a total field of view of 25,000 $\mu m^2$ in a vertical cross section which is a cross section in a thickness direction of the plating layer. In addition, the average circle-equivalent diameter was measured by the method described above. Here, the circle-equivalent diameter of the $MgZn_2$ phase is the diameter of a perfect circle corresponding to the $MgZn_2$ phase area.

The plating bath was prepared by mixing pure metals. For plating alloy components, Fe powder was added after a bath was built and the Fe concentration did not increase during the test. Regarding the components of the plating bath, a metal piece obtained by coagulating a plating bath was dissolved in an acid, and the solution was subjected to component analysis by ICP. In addition, the components of the plated steel sheet were stripped with hydrochloric acid to which an inhibitor was added, and the components were confirmed by performing component analysis after stripping the plating. Except for the Fe component, most components matched those of the plating bath component value (±0.5%).

The base sheet of the plated steel material was cut out from a cold-rolled steel sheet having a thickness of 0.8 mm to a size of 180 mm×100 mm. All steel materials were SS400 (general steel). Using a batch type hot dip plating simulator (commercially available from Rhesca Co., Ltd.), a K thermocouple was attached to a part of the steel sheet, in a N₂ reducing atmosphere containing 5% of H₂, annealing was performed at 800° C., the surface of the steel sheet was sufficiently reduced and the sample was then immersed in a plating bath for 3 seconds, then lifted, and the plating thickness was adjusted to 20 μm (±1 μm) by N₂ gas wiping. The thickness of the plating on the front and back was the same. After being lifted from the plating bath, plated steel materials were produced under the following various cooling conditions A to I. In addition, regarding the cooling patterns C to H, conditions in which a high-temperature gas containing φ0.5 μm Al₂O₃ was blown between 400 and 380° C. during cooling were defined as C # to H #.

Condition A (comparative condition): after the steel material was lifted from the plating bath, the average cooling rate between the bath temperature and 150° C. was constantly 5° C./sec or less.

Condition B (comparative condition): after the steel material was lifted from the plating bath, the average cooling rate between the bath temperature and 150° C. was constantly 20° C./sec or more.

Condition C: after the steel sheet was lifted from the plating bath, the average cooling rate between the bath temperature and 380° C. was less than 10° C./sec, and the steel sheet was passed between 400 and 380° C. for 10 sec or more, cooled at an average cooling rate of less than 5° C./sec between 380 and 300° C., and cooled at an average cooling rate of 10° C./sec or more between 300 and 150° C.

Condition D: after the steel sheet was lifted from the plating bath, the average cooling rate between the bath temperature and 380° C. was less than 10° C./sec, and the steel sheet was passed between 400 and 380° C. for less than 10 sec, cooled at an average cooling rate of more than 5° C./sec and 20° C./sec or less between 380 and 300° C., and cooled at an average cooling rate of 10° C./sec or more between 300 and 150° C.

Condition E (comparative condition): after the steel sheet was lifted from the plating bath, the average cooling rate between the bath temperature and 380° C. was less than 10° C./sec, and the steel sheet was passed between 400 and 380° C. for 10 sec or more, cooled at an average cooling rate of more than 20° C./sec and less than 50° C./sec between 380 and 300° C., and cooled at an average cooling rate of 10° C./sec or more between 300 and 150° C.

Condition F: after the steel sheet was lifted from the plating bath, the average cooling rate between the bath temperature and 380° C. was less than 10° C./sec, and the steel sheet was passed between 400 and 380° C. for less than 10 sec, cooled at an average cooling rate of more than 20° C./sec and less than 50° C./sec between 380 and 300° C., and cooled at an average cooling rate of 10° C./sec or more between 300 and 150° C.

Condition G: after the steel sheet was lifted from the plating bath, the average cooling rate between the bath temperature and 380° C. was less than 10° C./sec, and the steel sheet was passed between 400 and 380° C. for 10 sec or more, cooled at an average cooling rate of more than 5° C./sec and 20° C./sec or less between 380 and 300° C., and cooled at an average cooling rate of 10° C./sec or more between 300 and 150° C.

Condition H: after the steel sheet was lifted from the plating bath, the average cooling rate between the bath temperature and 380° C. was less than 10° C./sec, and the steel sheet was passed between 400 and 380° C. for 10 sec or more, cooled at an average cooling rate of less than 5° C./sec between 380 and 300° C., and cooled at an average cooling rate of 10° C./sec or more between 300 and 150° C.

Condition I: after the steel sheet was lifted from the plating bath, the average cooling rate between the bath temperature and 350° C. was less than 5° C./sec, and the steel sheet was passed between 400 and 380° C. for less than 10 sec. cooled at an average cooling rate of 10° C./sec or more between 350 and 250° C., and cooled at an average cooling rate of 10° C./sec or more between 250 and 150° C.

A spot welding evaluation sample and a corrosion test sample after spot welding were cut out from each of the produced plated steel sheets.

(Spot Welding Conditions)

A servo pressure stationary spot welding machine (air pressure type) was used. The power supply was a single-phase AC type. The frequency of the power supply was 50 Hz. A dome type chromium copper 40R (φ6 mm) was used for the electrode. The basic conditions were a pressure of 250 kg, a squeeze time of 30 cycles, an upslope of 10 cycles, a conducting time of 10 cycles, a retention time of 10 cycles, and a cooling water flow rate of 15 L/min. The number of respective cycles was set and changed to ±10 cycles as necessary. A weld-robe curve was created at necessary 0.2 kA increments. Temporary striking was performed in advance on 10 points at 10 kA.

Two overlapping spot-welded test pieces were produced and embedded in the resin and the width of the current value from when the nugget diameter was 4×√t=3.58 or more until rust occurred was defined as the appropriate current range.

The appropriate current range was evaluated as follows. "B" was unsatisfactory, and "A" to "S" were satisfactory.
less than 1.2 kA: "B"
less than 2 to 1.5 kA: "A"
less than 5 to 1.7 kA: "AA"
less than 7 to 1.9 kA: "AAA"
9 kA or more: "S"

(Spot Welding Continuous Spotting Property)

The median value of the appropriate current range was used, and evaluation was performed until the nugget diameter fell below 2√t. The number of spots when a case in which the nugget diameter was less than 2×√t occurred continuously three times was defined as the number of continuous spots. Every 50 points, the overlapping sheet was embedded in the resin and the nugget diameter was confirmed.

The continuous spotting property was evaluated according to the number of spots as follows. "B" was unsatisfactory, and "A" to "S" were satisfactory.
less than 150 points: "B"
150 to less than 250 points: "A"
250 to less than 500 points: "AA"
500 to less than 750 points: "AAA"
750 points or more: "S"

(Evaluation of Corrosion Resistance Around Spot-Welded Part)

Two plated steel sheets with a size of 70×150 mm and 30×75 mm were produced, overlapped at the central parts, and spot-welded at a distance of 20 mm from the center at 2 spots (the nugget diameter was 4√t or more) to produce an overlapping test piece. The sample was put into a combined cycle corrosion testing machine and subjected to a corrosion test according to JASO, M609-91. From the 150$^{th}$ cycle, every 30 cycles, the overlapping part was peeled off, and the red rust occurrence status (red rust occurrence at a red rust area fraction of 1% or more) was confirmed. The corrosion resistance was evaluated as follows. "B" was unsatisfactory, and "A" to "S" were satisfactory.

red rust occurrence was observed in less than 150 cycles: "B"

red rust occurred in 150 to 180 cycles: "A"
red rust occurred in 210 to 240 cycles: "AA"
red rust occurred in 270 to 300 cycles: "AAA"
red rust did not occur in 300 cycles: "S"

A 20×70 mm plated steel sheet was prepared and subjected to 0t180° bending to prepare a sample material. A cellophane tape was attached to a bent part of the sample material and then peeled off and the adhesion of the plating was confirmed. Specifically, the proportion of the area of the plating that was attached to and peeled off from the peeled cellophane tape with respect to the area of the cellophane tape attached to the bent part was calculated.

The adhesion was evaluated as follows. "B" was unsatisfactory, and "A" to "S" were satisfactory.

peeled plating area of more than 3%: "B"
peeled plating area of 1 to 3%: "A"
peeled plating area of less than 1%: "S"

As shown in Table 1A to Table 5B, in all of Nos. 2 to 8, 11 to 15, 18, 19, 21 to 26, 29, 30, 32, 34, 35, 37 to 39, 41, 42, 45, 47, 50, and 52 to 54, the chemical component and the metal structure of the plating layer were within the scope of the present invention, and the appropriate current range during spot welding, the continuous spotting property, and the corrosion resistance were all good.

As shown in Table 1A to Table 5B, in Nos. 1, 27, 28, 31, 33, 36, 40, 43, 44, 46, 48, 49, and 51, since the chemical component of the plating layer was outside the scope of the present invention, and the production conditions were outside the preferable ranges, all of the appropriate current range during spot welding, the continuous spotting property, and the corrosion resistance deteriorated.

As shown in Table 1A to Table 5B, in Nos. 9, 10, 16, 17, 20, 55, 56, 57, and 58, since the production conditions were outside the preferable ranges, and the structure of the plating layer was outside the scope of the present invention, all of the appropriate current range during spot welding, the continuous spotting property, and the corrosion resistance deteriorated.

TABLE 1A

| No. | Classification | Bath temperature (° C.) | Production classification | Plating layer (remainder of chemical component being impurities) Main element (mass%) | | |
|---|---|---|---|---|---|---|
| | | | | Zn | Al | Mg |
| 1 | Comparative Example | 500 | E | 91.29 | 4.0 | 4.1 |
| 2 | Example | 500 | E | 90.98 | 4.2 | 4.2 |
| 3 | Example | 500 | E# | 87.01 | 6.0 | 6.0 |
| 4 | Example | 500 | E# | 86.73 | 6.0 | 6.0 |
| 5 | Example | 500 | E | 87.00 | 6.0 | 6.0 |
| 6 | Example | 500 | E | 86.05 | 6.5 | 6.0 |
| 7 | Example | 500 | E# | 84.44 | 6.5 | 6.5 |
| 8 | Example | 500 | E# | 82.70 | 7.0 | 8.0 |
| 9 | Comparative Example | 500 | A | 83.10 | 7.0 | 8.0 |
| 10 | Comparative Example | 500 | B | 83.10 | 7.0 | 8.0 |
| 11 | Example | 500 | E# | 83.10 | 7.0 | 8.0 |
| 12 | Example | 500 | E# | 83.10 | 7.0 | 8.0 |
| 13 | Example | 500 | E# | 83.10 | 7.0 | 8.0 |
| 14 | Example | 500 | E# | 81.50 | 8.0 | 9.0 |
| 15 | Example | 500 | C# | 79.40 | 9.0 | 9.5 |
| 16 | Comparative Example | 500 | A | 79.90 | 9.0 | 9.5 |
| 17 | Comparative Example | 500 | B | 79.90 | 9.0 | 9.5 |

TABLE 1A-continued

| No. | Classification | Bath temperature (° C.) | Production classification | Plating layer (remainder of chemical component being impurities) Main element (mass%) | | |
|---|---|---|---|---|---|---|
| | | | | Zn | Al | Mg |
| 18 | Example: | 500 | | 79.90 | 9.0 | 9.5 |
| 19 | Example | 500 | C# | 79.90 | 9.0 | 9.5 |
| 20 | Comparative Example | 500 | E# | 80.90 | 9.0 | 8.0 |
| 21 | Example | 500 | G# | 77.25 | 10.0 | 10.0 |
| 22 | Example | 510 | C# | 77.40 | 11.0 | 9.0 |
| 23 | Example | 520 | C# | 74.70 | 12.0 | 11.0 |
| 24 | Example | 550 | H# | 71.90 | 13.0 | 12.0 |
| 25 | Example | 550 | C# | 70.70 | 14.0 | 11.5 |
| 26 | Example | 550 | C# | 66.44 | 14.5 | 12.3 |
| 27 | Comparative Example | 550 | F | 71.55 | 15.0 | 9.0 |
| 28 | Comparative Example | 500 | G | 92.85 | 3.5 | 3.0 |
| 29 | Example | 500 | E | 82.89 | 8.0 | 6.5 |

Underlined parts indicate outside the scope of the present invention or outside ranges of preferable production conditions.

TABLE 1B

| No. | Classification | Bath temperature (° C.) | Production classification | Plating layer (remainder of chemical component is impurities) Main element (mass%) | | |
|---|---|---|---|---|---|---|
| | | | | Zn | Al | Mg |
| 30 | Example | 500 | C | 76.85 | 10.0 | 9.0 |
| 31 | Comparative Example | 520 | C | 72.55 | 12.5 | 10.0 |
| 32 | Example | 500 | E# | 84.70 | 7.0 | 6.0 |
| 33 | Comparative Example | 500 | G# | 85.10 | 7.0 | 6.0 |
| 34 | Example | 500 | E | 86.10 | 7.0 | 6.0 |
| 35 | Example | 500 | E | 83.45 | 8.0 | 6.5 |
| 36 | Comparative Example | 500 | E | 83.50 | 8.0 | 6.5 |
| 37 | Example | 500 | E | 84.40 | 8.0 | 6.5 |
| 38 | Example | 550 | C# | 70.20 | 14.0 | 12.0 |
| 39 | Example | 550 | C# | 69.40 | 14.0 | 12.0 |
| 40 | Comparative Example | 550 | D | 71.40 | 14.0 | 12.0 |
| 41 | Example | 510 | C | 78.40 | 11.0 | 9.0 |
| 42 | Example | 510 | C# | 78.10 | 11.0 | 9.0 |
| 43 | Comparative Example | 510 | D# | 78.20 | 11.0 | 9.0 |
| 44 | Comparative Example | 550 | H# | 68.85 | 14.5 | 12.0 |
| 45 | Example | 500 | C# | 81.20 | 9.0 | 8.0 |
| 46 | Comparative Example | 500 | H | 81.40 | 9.0 | 8.0 |
| 47 | Example | 500 | C | 81.50 | 9.0 | 8.0 |
| 48 | Comparative Example: | 500 | C | 81.40 | 9.0 | 8.0 |
| 49 | Comparative Example | 500 | C | 85.00 | 8.0 | 6.0 |
| 50 | Example | 500 | E# | 85.67 | 7.0 | 6.0 |
| 51 | Comparative Example | 550 | G | 66.35 | 14.5 | 12.5 |
| 52 | Example | 500 | G | 83.15 | 8.5 | 7.0 |
| 53 | Example | 500 | H | 83.09 | 8.5 | 7.0 |
| 54 | Example | 500 | E# | 83.25 | 7.0 | 8.0 |
| 55 | Comparative Example | 450 | A | 89.10 | 5.0 | 5.0 |
| 56 | Comparative Example | 450 | E | 78.40 | 10.0 | 10.0 |
| 57 | Comparative Example | 500 | I | 83.90 | 7.0 | 8.0 |
| 58 | Comparative Example | 500 | I | 81.80 | 9.0 | 8.0 |

Underlined parts indicate outside the scope of the present invention or outside ranges of preferable production conditions.

TABLE 2A

| | Plating layer (remainder of chemical component being impurities) | | | | | | | | | | |
|---|---|---|---|---|---|---|---|---|---|---|---|
| | Element group A (mass %) | | | Element group B (mass %) | | | | | Element group C (mass %) | | |
| No. | Sn | Bi | In | Ca | Y | La | Ce | Sr | Si | B | P |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0.01 | 0.01 | 0 | 0.01 | 0 | 0 | 0 | 0 | 0.01 | 0 | 0 |
| 4 | 0.05 | 0.05 | 0.05 | 0.10 | 0 | 0 | 0 | 0 | 0.10 | 0 | 0 |
| 5 | 0.05 | 0 | 0.05 | 0.10 | 0 | 0 | 0 | 0 | 0 | 0 | 0 |
| 6 | 0.10 | 0 | 0 | 0.10 | 0 | 0 | 0 | 0 | 0.20 | 0 | 0 |
| 7 | 0.20 | 0 | 0 | 0.20 | 0 | 0 | 0 | 0 | 0.30 | 0 | 0 |
| 8 | 0.40 | 0 | 0 | 0.40 | 0 | 0 | 0 | 0 | 0.40 | 0 | 0 |
| 9 | 0.50 | 0 | 0 | 0.30 | 0 | 0 | 0 | 0 | 0.20 | 0 | 0 |
| 10 | 0.50 | 0 | 0 | 0.30 | 0 | 0 | 0 | 0 | 0.20 | 0 | 0 |
| 11 | 0.50 | 0 | 0 | 0.30 | 0 | 0 | 0 | 0 | 0.20 | 0 | 0 |
| 12 | 0.50 | 0 | 0 | 0.30 | 0 | 0 | 0 | 0 | 0.20 | 0 | 0 |
| 13 | 0.50 | 0 | 0 | 0.30 | 0 | 0 | 0 | 0 | 0.20 | 0 | 0 |
| 14 | 0 | 0 | 0 | 0.50 | 0 | 0 | 0 | 0 | 0 | 0 | 0 |
| 15 | 0 | 0 | 0 | 0.20 | 0 | 0 | 0 | 0 | 0.50 | 0 | 0 |
| 16 | 0 | 0 | 0 | 0.20 | 0 | 0 | 0 | 0 | 0.30 | 0 | 0 |
| 17 | 0 | 0 | 0 | 0.20 | 0 | 0 | 0 | 0 | 0.30 | 0 | 0 |
| 18 | 0 | 0 | 0 | 0.20 | 0 | 0 | 0 | 0 | 0.30 | 0 | 0 |
| 19 | 0 | 0 | 0 | 0.20 | 0 | 0 | 0 | 0 | 0.30 | 0 | 0 |
| 20 | 0.50 | 0 | 0 | 0.20 | 0 | 0 | 0 | 0 | 0.30 | 0 | 0 |
| 21 | 0 | 0 | 0 | 0.60 | 0 | 0 | 0 | 0 | 0.60 | 0 | 0 |
| 22 | 0.50 | 0 | 0 | 0.20 | 0 | 0 | 0 | 0 | 0.20 | 0 | 0 |
| 23 | 0.10 | 0 | 0 | 0.30 | 0 | 0 | 0 | 0 | 0.05 | 0 | 0 |
| 24 | 0 | 0 | 0 | 1.00 | 0 | 0 | 0 | 0 | 0.30 | 0 | 0 |
| 25 | 0 | 0 | 0 | 1.50 | 0 | 0 | 0 | 0 | 0.50 | 0 | 0 |
| 26 | 1.00 | 0 | 0 | 1.80 | 0 | 0 | 0 | 0 | 2.30 | 0 | 0 |
| 27 | 2.00 | 0 | 0 | 0.50 | 0 | 0 | 0 | 0 | 0.20 | 0 | 0 |
| 28 | 0 | 0 | 0 | 0.10 | 0 | 0 | 0 | 0 | 0 | 0 | 0 |
| 29 | 1.50 | 0 | 0 | 0 | 0.01 | 0 | 0 | 0 | 0 | 0 | 0 |

Underlined parts indicate outside the scope of the present invention or outside ranges of preferable production conditions.

TABLE 2B

| | Plating layer (remainder of chemical component being impurities) | | | | | | | | | | |
|---|---|---|---|---|---|---|---|---|---|---|---|
| | Element group A (mass %) | | | Element group B (mass %) | | | | | Element group C (mass %) | | |
| No. | Sn | Bi | In | Ca | Y | La | Ce | Sr | Si | B | P |
| 30 | 2.50 | 0 | 0 | 0 | 0.20 | 0 | 0 | 0 | 0 | 0 | 0 |
| 31 | 3.00 | 0 | 0 | 0.50 | 0 | 0 | 0 | 0 | 0 | 0 | 0 |
| 32 | 0 | 0.80 | 0 | 0 | 0.40 | 0 | 0 | 0 | 0 | 0 | 0 |
| 33 | 0 | 1.00 | 0 | 0 | 0 | 0 | 0 | 0 | 0 | 0 | 0 |
| 34 | 0 | 0 | 0 | 0 | 0 | 0 | 0 | 0 | 0 | 0 | 0 |
| 35 | 0 | 0 | 0.80 | 0 | 0 | 0.10 | 0.01 | 0 | 0 | 0 | 0 |
| 36 | 0 | 0 | 1.00 | 0 | 0 | 0 | 0 | 0 | 0 | 0 | 0 |
| 37 | 0 | 0 | 0 | 0 | 0 | 0 | 0 | 0 | 0 | 0 | 0 |
| 38 | 0 | 0 | 0 | 0.20 | 0 | 0.20 | 0.20 | 0 | 1.50 | 0 | 0 |
| 39 | 0 | 0 | 0 | 0 | 0 | 0.40 | 0.40 | 0 | 2.00 | 0 | 0 |
| 40 | 0 | 0 | 0 | 0 | 0 | 0.50 | 0.50 | 0 | 0 | 0 | 0 |
| 41 | 0 | 0 | 0 | 0 | 0 | 0 | 0 | 0.20 | 0 | 0 | 0 |
| 42 | 0 | 0 | 0 | 0 | 0 | 0 | 0 | 0.40 | 0 | 0 | 0 |
| 43 | 0 | 0 | 0 | 0 | 0 | 0 | 0 | 0.50 | 0 | 0 | 0 |
| 44 | 0 | 0 | 0 | 0.50 | 0 | 0 | 0 | 0 | 2.50 | 0 | 0 |
| 45 | 0 | 0 | 0 | 0.30 | 0 | 0 | 0 | 0 | 0 | 0.40 | 0 |
| 46 | 0 | 0 | 0 | 0 | 0 | 0 | 0 | 0 | 0 | 0.50 | 0 |
| 47 | 0 | 0 | 0 | 0 | 0 | 0 | 0 | 0 | 0 | 0 | 0.40 |
| 48 | 0 | 0 | 0 | 0 | 0 | 0 | 0 | 0 | 0 | 0 | 0.50 |
| 49 | 0 | 0 | 0 | 0 | 0 | 0 | 0 | 0 | 0 | 0 | 0 |
| 50 | 0 | 0 | 0 | 0.20 | 0 | 0 | 0 | 0 | 0.20 | 0.01 | 0 |
| 51 | 1.00 | 0 | 0 | 2.00 | 0 | 0 | 0 | 0 | 2.00 | 0 | 0 |
| 52 | 0 | 0 | 0 | 0.10 | 0 | 0 | 0 | 0 | 0.10 | 0 | 0 |
| 53 | 0 | 0 | 0 | 0.10 | 0 | 0 | 0 | 0 | 0.10 | 0.01 | 0 |
| 54 | 0.50 | 0 | 0 | 0.20 | 0 | 0 | 0 | 0 | 0.10 | 0 | 0 |
| 55 | 0.10 | 0 | 0 | 0.10 | 0 | 0 | 0 | 0 | 0 | 0 | 0 |
| 56 | 0 | 0 | 0 | 0.40 | 0 | 0 | 0 | 0 | 0 | 0 | 0 |
| 57 | 0 | 0 | 0 | 0 | 0 | 0 | 0 | 0 | 0.20 | 0 | 0 |
| 58 | 0 | 0 | 0 | 0.10 | 0 | 0 | 0 | 0 | 0 | 0 | 0 |

Underlined parts indicate outside the scope of the present invention or outside ranges of preferable production conditions.

TABLE 3A

| | Plating layer (remainder of chemical component being impurities) | | | | | | | | | | |
|---|---|---|---|---|---|---|---|---|---|---|---|
| | Element group D (mass %) | | | | | | | | Element group E (mass %) | | |
| No. | Cr | Ti | Ni | Co | V | Nb | Cu | Mn | Fe | Sb | Pb | Mg/Al |
| 1 | 0 | 0 | 0 | 0 | 0 | 0 | 0 | 0 | 0.60 | 0.01 | 0 | 1.03 |
| 2 | 0 | 0 | 0 | 0 | 0 | 0 | 0 | 0 | 0.62 | 0 | 0 | 1.00 |
| 3 | 0.05 | 0 | 0.1 | 0 | 0 | 0 | 0 | 0 | 0.80 | 0 | 0 | 1.00 |
| 4 | 0 | 0 | 0.1 | 0 | 0 | 0 | 0 | 0 | 0.80 | 0.02 | 0 | 1.00 |
| 5 | 0 | 0 | 0.1 | 0 | 0 | 0 | 0 | 0 | 0.80 | 0 | 0 | 1.00 |

TABLE 3A-continued

| | Plating layer (remainder of chemical component being impurities) | | | | | | | | | | |
|---|---|---|---|---|---|---|---|---|---|---|---|
| | Element group D (mass %) | | | | | | | | Element group E (mass %) | | |
| No. | Cr | Ti | Ni | Co | V | Nb | Cu | Mn | Fe | Sb | Pb | Mg/Al |
| 6 | 0.10 | 0 | 0.1 | 0 | 0 | 0 | 0 | 0 | 0.85 | 0 | 0 | 0.92 |
| 7 | 0.20 | 0 | 0.8 | 0 | 0 | 0 | 0 | 0 | 0.85 | 0 | 0.01 | 1.00 |
| 8 | 0 | 0 | 0.2 | 0 | 0 | 0 | 0 | 0 | 0.90 | 0 | 0 | 1.14 |
| 9 | 0 | 0 | 0 | 0 | 0 | 0 | 0 | 0 | 0.90 | 0 | 0 | 1.14 |
| 10 | 0 | 0 | 0 | 0 | 0 | 0 | 0 | 0 | 0.90 | 0 | 0 | 1.14 |
| 11 | 0 | 0 | 0 | 0 | 0 | 0 | 0 | 0 | 0.90 | 0 | 0 | 1.14 |
| 12 | 0 | 0 | 0 | 0 | 0 | 0 | 0 | 0 | 0.90 | 0 | 0 | 1.14 |
| 13 | 0 | 0 | 0 | 0 | 0 | 0 | 0 | 0 | 0.90 | 0 | 0 | 1.14 |
| 14 | 0 | 0 | 0 | 0 | 0 | 0 | 0 | 0 | 1.00 | 0 | 0 | 1.13 |
| 15 | 0 | 0 | 0 | 0 | 0 | 0 | 0.10 | 0 | 1.10 | 0 | 0.20 | 1.06 |
| 16 | 0 | 0 | 0 | 0 | 0 | 0 | 0 | 0 | 1.10 | 0 | 0 | 1.06 |
| 17 | 0 | 0 | 0 | 0 | 0 | 0 | 0 | 0 | 1.10 | 0 | 0 | 1.06 |
| 18 | 0 | 0 | 0 | 0 | 0 | 0 | 0 | 0 | 1.10 | 0 | 0 | 1.06 |
| 19 | 0 | 0 | 0 | 0 | 0 | 0 | 0 | 0 | 1.10 | 0 | 0 | 1.06 |
| 20 | 0 | 0 | 0 | 0 | 0 | 0 | 0 | 0 | 1.10 | 0 | 0 | 0.89 |
| 21 | 0 | 0 | 0 | 0 | 0 | 0 | 0.35 | 0 | 1.20 | 0 | 0 | 1.00 |
| 22 | 0 | 0 | 0 | 0 | 0 | 0 | 0 | 0 | 1.30 | 0.40 | 0 | 0.82 |
| 23 | 0 | 0 | 0 | 0 | 0 | 0 | 0.05 | 0 | 1.40 | 0 | 0.40 | 0.92 |
| 24 | 0 | 0 | 0 | 0.10 | 0 | 0 | 0 | 0 | 1.50 | 0.20 | 0 | 0.92 |
| 25 | 0 | 0 | 0 | 0.20 | 0 | 0 | 0 | 0 | 1.60 | 0 | 0 | 0.82 |
| 26 | 0 | 0.01 | 0 | 0 | 0 | 0 | 0 | 0 | 1.65 | 0 | 0 | 0.85 |
| 27 | 0 | 0.05 | 0 | 0 | 0 | 0 | 0 | 0 | 1.70 | 0 | 0 | 0.60 |
| 28 | 0 | 0 | 0 | 0 | 0 | 0 | 0 | 0 | 0.55 | 0 | 0 | 0.86 |
| 29 | 0 | 0 | 0 | 0 | 0 | 0 | 0 | 0.10 | 1.00 | 0 | 0 | 0.81 |

Underlined parts indicate outside the scope of the present invention or outside ranges of preferable production conditions.

TABLE 3B

| | Plating layer (remainder of chemical component being impurities) | | | | | | | | | | |
|---|---|---|---|---|---|---|---|---|---|---|---|
| | Element group D (mass %) | | | | | | | | Element group E (mass %) | | |
| No. | Cr | Ti | Ni | Co | V | Nb | Cu | Mn | Fe | Sb | Pb | Mg/Al |
| 30 | 0 | 0 | 0 | 0 | 0 | 0 | 0 | 0.20 | 1.20 | 0.05 | 0 | 0.90 |
| 31 | 0 | 0 | 0 | 0 | 0 | 0 | 0 | 0 | 1.45 | 0 | 0 | 0.80 |
| 32 | 0 | 0.20 | 0 | 0 | 0 | 0 | 0 | 0 | 0.90 | 0 | 0 | 0.86 |
| 33 | 0 | 0 | 0 | 0 | 0 | 0 | 0 | 0 | 0.90 | 0 | 0 | 0.86 |
| 34 | 0 | 0 | 0 | 0 | 0 | 0 | 0 | 0 | 0.90 | 0 | 0 | 0.86 |
| 35 | 0 | 0.23 | 0 | 0 | 0 | 0 | 0 | 0 | 1.00 | 0 | 0 | 0.81 |
| 36 | 0 | 0 | 0 | 0 | 0 | 0 | 0 | 0 | 1.00 | 0 | 0 | 0.81 |
| 37 | 0 | 0 | 0 | 0 | 0 | 0.10 | 0 | 0 | 1.00 | 0 | 0 | 0.81 |
| 38 | 0 | 0 | 0 | 0 | 0.10 | 0 | 0 | 0 | 1.60 | 0 | 0 | 0.86 |
| 39 | 0 | 0 | 0 | 0 | 0.20 | 0 | 0 | 0 | 1.60 | 0 | 0 | 0.86 |
| 40 | 0 | 0 | 0 | 0 | 0 | 0 | 0 | 0 | 1.60 | 0 | 0 | 0.86 |
| 41 | 0 | 0 | 0 | 0 | 0 | 0.10 | 0 | 0 | 1.30 | 0 | 0 | 0.82 |
| 42 | 0 | 0 | 0 | 0 | 0 | 0.20 | 0 | 0 | 1.30 | 0 | 0 | 0.82 |
| 43 | 0 | 0 | 0 | 0 | 0 | 0 | 0 | 0 | 1.30 | 0 | 0 | 0.82 |
| 44 | 0 | 0 | 0 | 0 | 0 | 0 | 0 | 0 | 1.65 | 0 | 0 | 0.83 |
| 45 | 0 | 0 | 0 | 0 | 0 | 0 | 0 | 0 | 1.10 | 0 | 0 | 0.89 |
| 46 | 0 | 0 | 0 | 0 | 0 | 0 | 0 | 0 | 1.10 | 0 | 0 | 0.89 |
| 47 | 0 | 0 | 0 | 0 | 0 | 0 | 0 | 0 | 1.10 | 0 | 0 | 0.89 |
| 48 | 0 | 0 | 0 | 0 | 0 | 0 | 0 | 0 | 1.10 | 0 | 0 | 0.89 |
| 49 | 0 | 0 | 0 | 0 | 0 | 0 | 0 | 0 | 1.00 | 0 | 0 | 0.75 |
| 50 | 0 | 0.02 | 0 | 0 | 0 | 0 | 0 | 0 | 0.90 | 0 | 0 | 0.86 |
| 51 | 0 | 0 | 0 | 0 | 0 | 0 | 0 | 0 | 1.65 | 0 | 0 | 0.86 |
| 52 | 0.05 | 0 | 0 | 0 | 0 | 0 | 0 | 0 | 1.05 | 0 | 0.05 | 0.82 |
| 53 | 0 | 0 | 0 | 0 | 0 | 0 | 0 | 0.10 | 1.05 | 0.05 | 0 | 0.82 |
| 54 | 0 | 0 | 0. | 0 | 0 | 0 | 0.05 | 0 | 0.90 | 0 | 0 | 1.14 |
| 55 | 0 | 0 | 0 | 0 | 0 | 0 | 0 | 0 | 0.70 | 0 | 0 | 1.00 |
| 56 | 0 | 0 | 0 | 0 | 0 | 0 | 0 | 0 | 1.20 | 0 | 0 | 1.00 |
| 57 | 0 | 0 | 0 | 0 | 0 | 0 | 0 | 0 | 0.90 | 0 | 0 | 1.14 |
| 58 | 0 | 0 | 0 | 0 | 0 | 0 | 0 | 0 | 1.10 | 0 | 0 | 0.89 |

Underlined parts indicate outside the scope of the present invention or outside ranges of preferable production conditions.

TABLE 4A

| | | Plating layer Structure | | | | | |
|---|---|---|---|---|---|---|---|
| | | MgZn$_2$ | | Al | | | |
| No. | Area % | Average circle-equivalent diameter (μm) | Al—Zn phase (area %) | Al phase (area %) | Quasi-crystalline (area %) | Ternary eutectic (area %) | Remainder (area %) |
| 1 | 10 | 5 | 10 | 0 | 0 | 75 | 5 |
| 2 | 20 | 5 | 10 | 0 | 0 | 65 | 5 |
| 3 | 25 | 30 | 10 | 0 | 0 | 60 | 5 |
| 4 | 25 | 30 | 10 | 0 | 0 | 60 | 5 |
| 5 | 25 | 10 | 10 | 0 | 0 | 60 | 5 |
| 6 | 25 | 10 | 10 | 0 | 0 | 60 | 5 |
| 7 | 25 | 30 | 10 | 0 | 0 | 60 | 5 |
| 8 | 35 | 40 | 15 | 0 | 1 | 45 | 4 |
| 9 | 35 | 25 | 0 | 20 | 1 | 40 | 4 |
| 10 | 5 | 10 | 20 | 0 | 1 | 70 | 4 |
| 11 | 30 | 30 | 10 | 0 | 1 | 55 | 4 |
| 12 | 35 | 40 | 15 | 0 | 1 | 45 | 4 |
| 13 | 35 | 40 | 10 | 0 | 1 | 50 | 4 |
| 14 | 40 | 50 | 20 | 5 | 1 | 30 | 4 |
| 15 | 40 | 40 | 20 | 0 | 2 | 35 | 3 |
| 16 | 40 | 25 | 0 | 20 | 2 | 35 | 3 |
| 17 | 5 | 10 | 15 | 5 | 2 | 70 | 3 |
| 18 | 30 | 10 | 20 | 5 | 2 | 40 | 3 |
| 19 | 40 | 40 | 15 | 5 | 2 | 35 | 3 |
| 20 | 40 | 40 | 0 | 20 | 1 | 35 | 4 |
| 21 | 35 | 40 | 25 | 5 | 2 | 30 | 3 |
| 22 | 35 | 30 | 20 | 10 | 1 | 30 | 4 |
| 23 | 40 | 30 | 15 | 10 | 2 | 30 | 3 |
| 24 | 40 | 50 | 15 | 10 | 3 | 30 | 2 |
| 25 | 40 | 50 | 15 | 10 | 3 | 30 | 2 |
| 26 | 40 | 50 | 15 | 10 | 3 | 30 | 2 |
| 27 | 35 | 25 | 10 | 20 | 3 | 30 | 2 |
| 28 | 5 | 10 | 10 | 0 | 0 | 80 | 5 |
| 29 | 15 | 10 | 15 | 0 | 0 | 65 | 5 |

Underlined parts indicate outside the scope of the present invention or outside ranges of preferable production conditions.

TABLE 4B

| | | Plating layer Structure | | | | | |
|---|---|---|---|---|---|---|---|
| | | MgZn$_2$ | | Al | | | |
| No. | Area % | Average circle-equivalent diameter (μm) | Al—Zn phase (area %) | Al phase (area %) | Quasi-crystalline (area %) | Ternary eutectic (area %) | Remainder (area%) |
| 30 | 35 | 20 | 25 | 5 | 2 | 30 | 3 |
| 31 | 35 | 25 | 20 | 10 | 2 | 30 | 3 |
| 32 | 25 | 40 | 10 | 0 | 0 | 60 | 5 |
| 33 | 25 | 40 | 40 | 0 | 0 | 30 | 5 |
| 34 | 25 | 5 | 15 | 0 | 0 | 55 | 5 |
| 35 | 15 | 10 | 20 | 0 | 0 | 60 | 5 |
| 36 | 15 | 5 | 20 | 0 | 0 | 60 | 5 |
| 37 | 15 | 5 | 20 | 0 | 0 | 60 | 5 |
| 38 | 40 | 50 | 15 | 10 | 3 | 30 | 2 |
| 39 | 40 | 50 | 15 | 10 | 3 | 30 | 2 |
| 40 | 40 | 10 | 15 | 15 | 3 | 25 | 2 |
| 41 | 30 | 20 | 20 | 10 | 2 | 35 | 3 |
| 42 | 30 | 40 | 20 | 10 | 2 | 35 | 3 |
| 43 | 30 | 50 | 20 | 10 | 2 | 35 | 3 |
| 44 | 40 | 50 | 15 | 15 | 3 | 25 | 2 |
| 45 | 35 | 40 | 20 | 0 | 1 | 40 | 4 |
| 46 | 35 | 5 | 20 | 5 | 1 | 35 | 4 |
| 47 | 35 | 5 | 20 | 5 | 1 | 35 | 4 |

TABLE 4B-continued

| | | Plating layer Structure | | | | | |
|---|---|---|---|---|---|---|---|
| | | MgZn$_2$ | | Al | | | |
| No. | Area % | Average circle-equivalent diameter (μm) | Al—Zn phase (area %) | Al phase (area %) | Quasi-crystalline (area %) | Ternary eutectic (area %) | Remainder (area%) |
| 48 | 35 | 5 | 20 | 5 | 1 | 35 | 4 |
| 49 | 20 | 5 | 40 | 0 | 0 | 35 | 5 |
| 50 | 25 | 30 | 10 | 0 | 0 | 60 | 5 |
| 51 | 44 | 25 | 15 | 15 | 5 | 20 | 1 |
| 52 | 25 | 10 | 10 | 10 | 0 | 50 | 5 |
| 53 | 25 | 10 | 10 | 10 | 0 | 50 | 5 |
| 54 | 35 | 30 | 20 | 0 | 1 | 40 | 4 |
| 55 | 5 | 10 | 10 | 15 | 1 | 65 | 4 |
| 56 | 35 | 20 | 5 | 20 | 2 | 35 | 3 |
| 57 | 40 | 10 | 30 | 0 | 2 | 25 | 3 |
| 58 | 25 | 20 | 5 | 20 | 2 | 45 | 3 |

Underlined parts indicate outside the scope of the present invention or outside ranges of preferable production conditions.

TABLE 5A

| | Performance | | | |
|---|---|---|---|---|
| | Spot welding properties | | | |
| No. | Appropriate current range | Continuous spotting property | Corrosion resistance | Adhesion |
| 1 | B | B | B | A |
| 2 | A | AAA | A | A |
| 3 | S | AAA | AA | S |
| 4 | S | AAA | AA | S |
| 5 | AA | AAA | AA | A |
| 6 | S | AAA | AA | S |
| 7 | S | AA | AA | S |
| 8 | S | S | S | S |
| 9 | B | B | B | S |
| 10 | B | B | B | S |
| 11 | S | AAA | AAA | S |
| 12 | AAA | S | S | S |
| 13 | AAA | S | S | S |
| 14 | AA | S | AAA | S |
| 15 | S | S | AAA | S |
| 16 | B | B | B | S |
| 17 | B | B | B | S |
| 18 | AAA | AAA | AA | S |
| 19 | AAA | S | AAA | S |
| 20 | B | B | B | S |
| 21 | S | S | AA | S |
| 22 | AAA | AAA | S | S |
| 23 | S | AAA | S | S |
| 24 | S | AAA | AA | S |
| 25 | S | AAA | AA | S |
| 26 | S | AAA | AAA | S |
| 27 | B | B | B | S |
| 28 | B | B | B | S |
| 29 | AA | AA | AA | S |

Underlined parts indicate outside the scope of the present invention or outside ranges of preferable production conditions.

TABLE 5B

| | Performance | | | |
|---|---|---|---|---|
| | Spot welding properties | | | |
| No. | Appropriate current range | Continuous spotting property | Corrosion resistance | Adhesion |
| 30 | AA | AAA | AAA | S |
| 31 | B | B | B | S |
| 32 | AA | S | AAA | A |
| 33 | B | B | B | A |
| 34 | AA | AAA | A | A |
| 35 | AA | A | AA | S |
| 36 | B | B | B | S |
| 37 | AA | A | A | S |
| 38 | S | AAA | AAA | S |
| 39 | S | AAA | AAA | S |
| 40 | B | B | B | S |
| 41 | AA | AA | AA | S |
| 42 | AA | AA | AAA | S |
| 43 | B | B | B | S |
| 44 | B | B | B | S |
| 45 | AAA | S | AAA | S |
| 46 | B | B | B | S |
| 47 | AA | AAA | AA | S |
| 48 | B | B | B | S |
| 49 | B | B | B | S |
| 50 | S | AAA | A | S |
| 51 | B | B | B | S |
| 52 | AAA | AA | A | S |
| 53 | AAA | AA | A | S |
| 54 | AAA | S | S | S |
| 55 | B | B | B | B |
| 56 | B | B | B | B |
| 57 | B | B | B | S |
| 58 | B | B | B | A |

Underlined parts indicate outside the scope of the present invention or outside ranges of preferable production conditions.

BRIEF DESCRIPTION OF THE REFERENCE SYMBOLS

1 [Al/MgZn$_2$/Zn ternary eutectic structure]
2 Al—Zn phase
3 MgZn$_2$ phase
4 Al phase

The invention claimed is:

1. A plated steel material comprising:
a steel material, and
a plating layer provided on the surface of the steel material,
wherein the plating layer has an average chemical composition including, in mass %,
Al: more than 4.0% and less than 15.0%,
Mg: more than 3.2% and less than 12.5%,
Sn: 0% or more and less than 3.00%,
Bi: 0% or more and less than 1.00%,
In: 0% or more and less than 1.00%,
Ca: 0% or more and less than 2.00%,
Y: 0% or more and less than 0.50%,
La: 0% or more and less than 0.50%,
Ce: 0% or more and less than 0.50%,
Sr: 0% or more and less than 0.50%,
Si: 0% or more and less than 2.50%,
B: 0% or more and less than 0.50%,
P: 0% or more and less than 0.50%
Cr: 0% or more and less than 0.25%,
Ti: 0% or more and less than 0.25%,
Ni: 0% or more and less than 1.0%,
Co: 0% or more and less than 0.25%,
V: 0% or more and less than 0.25%,
Nb: 0% or more and less than 0.25%,
Cu: 0% or more and less than 0.40%,
Mn: 0% or more and less than 0.25%,
Fe: 0% or more and less than 5.00%,
Sb: 0% or more and less than 0.5%, and
Pb: 0% or more and less than 0.5%,
with the remainder being more than 50.00% of Zn and impurities,
wherein, in mass %, when the amount of Mg is % Mg and the amount of Al is % Al, % Mg/% Al is 0.80 or more, and
wherein a metal structure in a total field of view of 25,000 μm$^2$ in a vertical cross section which is a cross section in a thickness direction of the plating layer includes 10 to 40 area % of a MgZn$_2$ phase, 10 to 30 area % of an Al—Zn phase with a Zn content of 10% or more, 0 to 15 area % of an Al phase with a Zn content of less than 10%, and 25 area % or more of an Al/MgZn$_2$/Zn ternary eutectic structure.

2. The plated steel material according to claim 1, wherein, in the average chemical composition of the plating layer, the amount of at least one or two or more of Ca, Y, La, Ce, and Sr is 0.01 mass % or more.

3. The plated steel material according to claim 2, wherein the average circle-equivalent diameter of the top 80% MgZn$_2$ phase particles having the largest circle-equivalent diameter among the MgZn$_2$ phase particles of the metal structure in a total field of view of 25,000 μm$^2$ in a vertical cross section which is a cross section in a thickness direction of the plating layer is 30 μm or more.

4. The plated steel material according to claim 1, wherein the average circle-equivalent diameter of the top 80% MgZn$_2$ phase particles having the largest circle-equivalent diameter among the MgZn$_2$ phase particles of the metal structure in a total field of view of 25,000 μm$^2$ in a vertical cross section which is a cross section in a thickness direction of the plating layer is 30 μm or more.

* * * * *